(12) United States Patent
Greiner et al.

(10) Patent No.: US 6,965,716 B2
(45) Date of Patent: Nov. 15, 2005

(54) AMPLITUDE AND PHASE CONTROL IN DISTRIBUTED OPTICAL STRUCTURES

(75) Inventors: Christoph M. Greiner, Eugene, OR (US); Dmitri Iazikov, Springfield, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 10/989,236

(22) Filed: Nov. 15, 2004

(65) Prior Publication Data

US 2005/0135744 A1 Jun. 23, 2005

Related U.S. Application Data

(63) Continuation of application No. 10/653,876, filed on Sep. 2, 2003, now Pat. No. 6,829,417, which is a continuation-in-part of application No. 10/229,444, filed on Aug. 27, 2002, now Pat. No. 6,678,429.

(60) Provisional application No. 60/486,450, filed on Jul. 10, 2003, provisional application No. 60/468,479, filed on May 7, 2003, provisional application No. 60/370,182, filed on Apr. 4, 2002, provisional application No. 60/315,302, filed on Aug. 27, 2001.

(51) Int. Cl.[7] ............................................. G02B 6/34
(52) U.S. Cl. ........................ 385/37; 385/3; 385/10; 385/14; 359/565; 359/569

(58) Field of Search .............................. 385/1, 3, 8–10, 385/14, 36, 37, 123; 359/565, 566, 569, 570, 359/576

(56) References Cited

U.S. PATENT DOCUMENTS

6,678,429 B2 * 1/2004 Mossberg et al. ............. 385/10
6,829,417 B2 * 12/2004 Greiner et al. ................ 385/37

* cited by examiner

*Primary Examiner*—Phan T. H. Palmer
(74) *Attorney, Agent, or Firm*—David S. Alavi

(57) ABSTRACT

A distributed optical structure comprises a set of diffractive elements. Individual diffractive element transfer functions collectively yield an overall transfer function between entrance and exit ports. Diffractive elements are defined relative to virtual contours and include diffracting region(s) altered to diffract, reflect, and/or scatter incident optical fields (altered index, surface, etc). Element and/or overall set transfer functions (amplitude and/or phase) are determined by: longitudinal and/or angular displacement of diffracting region(s) relative to a virtual contour (facet-displacement grayscale); longitudinal displacement of diffractive elements relative to a virtual contour (element-displacement grayscale); and/or virtual contour(s) lacking a diffractive element (proportional-line-density gray scale). Optical elements may be configured: as planar or channel waveguides, with curvilinear diffracting segments; to support three-dimensional propagation with surface areal diffracting segments; as a diffraction grating, with grating groove or line segments.

6 Claims, 18 Drawing Sheets

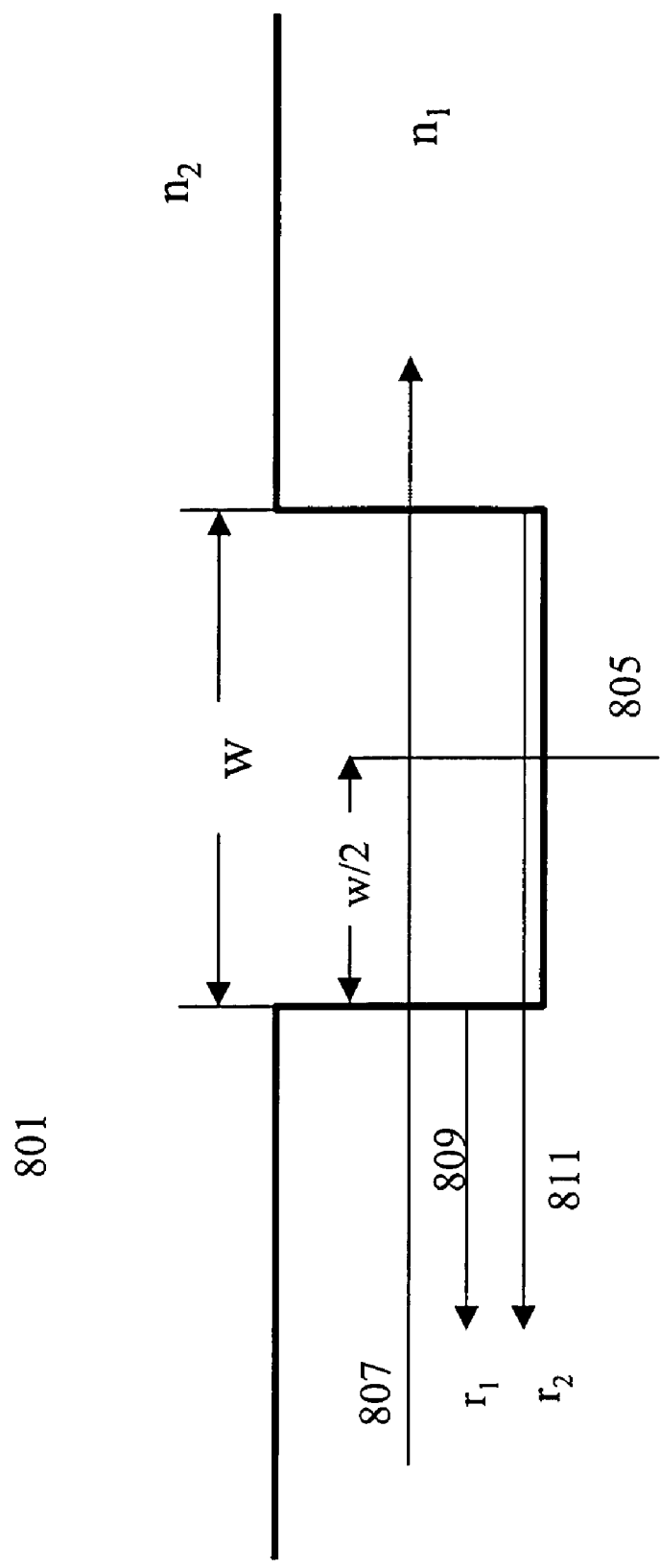

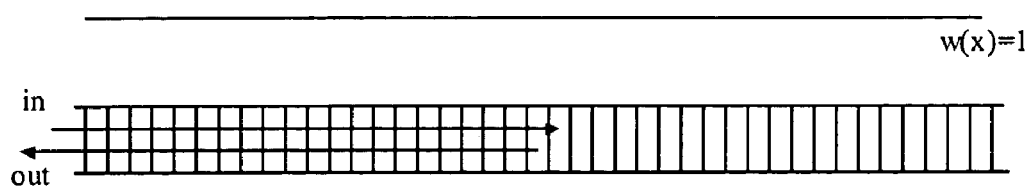
Figure 9a
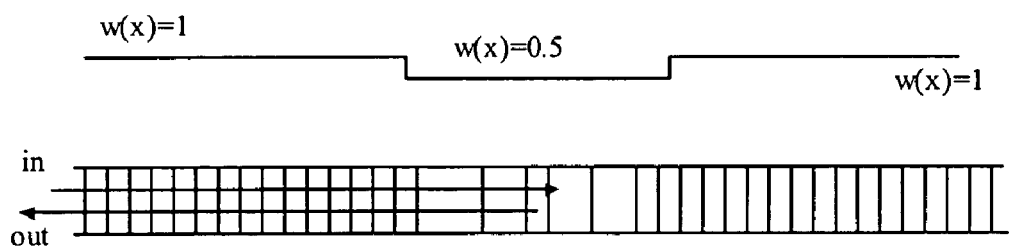
Figure 9b    x ⟶

AMPLITUDE AND PHASE CONTROL IN DISTRIBUTED OPTICAL STRUCTURES

BENEFIT CLAIMS TO RELATED APPLICATIONS

This application is a continuation of prior-filed non-provisional application Ser. No. 10/653,876 filed Sep. 2, 2003 now U.S. Pat. No. 6,829,417, in the names of Christoph M. Greiner, Dmitri Iazikov, and Thomas W. Mossberg, which in turn claims benefit of prior-filed provisional App. No. 60/468,479 filed May 7, 2003 in the names of Christoph M. Greiner, Dmitri Iazikov, and Thomas W. Mossberg, and prior-filed provisional App. No. 60/486,450 filed Jul. 10, 2003 in the names of Christoph M. Greiner, Dmitri Iazikov, and Thomas W. Mossberg, each of said application Ser. Nos. 10/653,876, 60/468,479, and 60/486,450 being hereby incorporated by reference as if fully set forth herein. application Ser. No. 10/653,876 is also a continuation-in-part of prior-filed non-provisional application Ser. No. 10/229,444 filed Aug. 27, 2002 in the names of Thomas W. Mossberg and Christoph M. Greiner (now U.S. Pat. No. 6,678,429 issued Jan. 14, 2004), which in turn claims benefit of prior-filed provisional App. No. 60/315,302 filed Aug. 27, 2001 in the name of Thomas W. Mossberg, and prior-filed provisional App. No. 60/370,182 filed Apr. 4, 2002 in the names of Thomas W. Mossberg and Christoph M. Greiner, each of said application Ser. Nos. 10/229,444, 60/315,302, and 60/370,182 being hereby incorporated by reference as if fully set forth herein.

BACKGROUND

The field of the present invention relates to optical devices incorporating distributed optical structures. In particular, apparatus and methods are described herein for implementing amplitude and phase control in distributed diffractive optical structures.

Distributed optical structures in one-, two-, or three-dimensional geometries offer powerful optical functionality and enable entirely new families of devices for use in a variety of areas including optical communications, spectral sensing, optical waveform coding, optical waveform processing, and optical waveform recognition. It is important in the design of distributed optical structures to have means to control the amplitude and phase of the electromagnetic field diffracted by individual diffractive elements within the overall distributed structure. This invention relates to approaches for fabricating diffractive elements that provide flexible control over diffractive amplitude and phase.

A distributed optical structure typically includes a large number of individual diffractive elements. Each individual diffractive element may scatter (and/or reflect and/or diffract) only a small portion of the total light incident on the distributed structure. This may be because the individual diffractive elements subtend only a small fraction of available solid angle of the incident optical field in the interaction region, and/or because individual diffractive elements have a small reflection, diffraction, or scattering coefficient. Distributed optical structures in two or three dimensions can also be described as volume holograms since they have the capability to transform the spatial and spectral properties of input beams to desired forms.

There are many reasons why it is important to have control over the amplitude and/or phase of the portions of the field scattered by individual diffractive elements. For example, a distributed optical structure can act as a general spectral filter supporting a broad range of transfer functions. In the weak-reflection approximation, the spectral transfer function of a structure is approximately proportional to the spatial Fourier transform of the structure's complex-valued scattering coefficient—as determined by the amplitude and phase of the field scattered by individual diffractive elements (See: T. W. Mossberg, Optics Letters Vol. 26, p. 414 (2001); T. W. Mossberg, SPIE International Technology Group Newsletter, Vol. 12, No. 2 (November 2001); and the applications cited hereinabove). In order to produce a general spectral transfer function, it is useful to control the amplitude and phase of each constituent diffractive element. Application of the present invention provides for such control. Also, when multiple distributed structures are overlaid in the same spatial region, system linearity can only be maintained by ensuring that the diffractive strength of overlaid diffractive elements is the sum of the individual diffractive element strengths. When diffractive elements are lithographically scribed, overlaid structures will not typically produce a summed response. The approaches of the present invention provide means for modifying overlaid diffractive elements (formed by lithographic and/or other suitable means) so that each element negligibly affects another's transfer function.

SUMMARY

An optical apparatus according to the present invention comprises an optical element having a set of multiple diffractive elements. Each diffractive element diffracts a corresponding diffracted component of an incident optical field with a corresponding diffractive element transfer function. Collectively, the diffractive elements provide an overall transfer function between an entrance optical port and an exit optical port (which may be defined structurally and/or functionally). Each diffractive element includes at least one diffracting region modified or altered in some way so as to diffract, reflect, and/or scatter a portion of an incident optical field, and is spatially defined relative to a corresponding one of a set of diffractive element virtual contours. The virtual contours are spatially arranged so that, if the diffracting regions of the corresponding diffractive elements were to spatially coincide with the virtual contours, the resulting superposition of corresponding diffracted components at a design wavelength would exhibit maximal constructive interference at the exit port. The modification to form a diffracting region typically involves a differential between some optical property of the diffracting region relative to the corresponding average optical property of the optical element (effective index, bulk index, surface profile, and so forth).

The optical element may be a planar (2D) or channel (1D) waveguide, with optical field propagation substantially confined in at least one transverse dimension. In a waveguide, the diffracting regions are curvilinear segments having some alteration of an optical property relative to the waveguide. The optical element may be a 3D optical element enabling three-dimensional propagation of optical fields therein, with the diffracting regions being surface areal segments of surface contours within the volume of the optical element. The optical element may be a diffraction grating, the diffracting regions being segments of the grating lines or curvilinear grooves that are formed on the grating. These various distributed optical devices may define one or more ports, and may provide one or more spatial/spectral transfer functions between the one or more ports.

For a channel or planar waveguide, a 3D optical element, or a diffraction grating, the overall transfer function and/or at least one corresponding diffractive element transfer function is determined at least in part by longitudinal and/or angular displacement of at least one diffracting region relative to the corresponding virtual contour. For a planar waveguide, a 3D optical element, or a diffraction grating, the overall transfer function and/or at least one corresponding diffractive element transfer function is determined at least in part by: longitudinal and/or angular displacement of at least one diffracting region relative to the corresponding virtual contour; longitudinal displacement of at least one diffractive element relative to the corresponding virtual contour; and/or at least one virtual contour lacking a diffractive element corresponding thereto.

Various objects and advantages pertaining to distributed optical structures may become apparent upon referring to the preferred and alternative embodiments of the present invention as illustrated in the drawings and described in the following written description and/or claims.

BRIEF DESCRIPTION OF THE DRAWINGS

FIG. 8 is a cross-sectional view of an individual diffractive element.

FIGS. 9a and 9b are schematic diagrams of distributed optical devices having constant and position-dependent density of diffractive elements, respectively.

Figure 1:
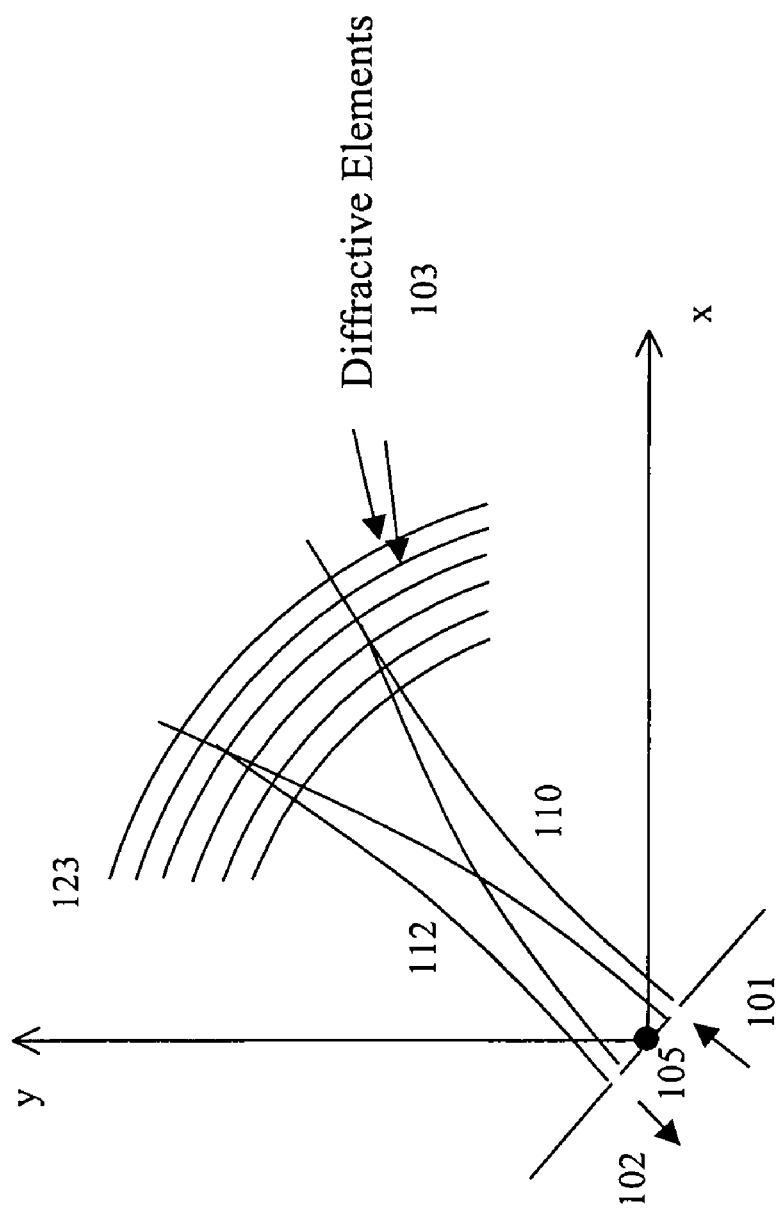
FIG. 1 is a schematic diagram of a distributed optical device implemented in a planar optical waveguide.

In the Figures, it should be noted that many of the embodiments depicted are only shown schematically, and that not all features may be shown in full detail or in proper proportion. Certain features or structures may be exaggerated relative to others for clarity. It should also be noted that the embodiments shown in the Figures are exemplary only, and should not be construed as specifically limiting the scope of the written description or the claims set forth herein.

The embodiments shown in the Figures are exemplary, and should not be construed as limiting the scope of the present disclosure and/or appended claims.

DETAILED DESCRIPTION OF EMBODIMENTS

Definitions

Distributed Optical Structure: A collection of two or more diffractive elements spanning a region of space that are collectively active to diffract, reflect, or redirect at least a portion of an input optical field, thereby creating an output field whose spectral and spatial properties differ from those of the input field in a manner determined by the structure of individual constituent diffractive elements and the detailed relative arrangement of the constituent diffractive elements. A holographic Bragg reflector (HBR) and a diffraction grating are examples of distributed optical structures. A distributed optical structure may also be referred to as a distributed diffractive optical structure, a distributed optical device, a distributed diffractive optical device, and so forth.

Diffractive Element: Generalization of a single line or groove in a standard surface-type diffraction grating. In general, a diffractive element may comprise one or more diffracting regions thereof (also referred to as diffracting segments or diffracting facets), the diffracting regions having one or more altered optical properties so as to enable diffraction (and/or reflection and/or scattering) of a portion of an incident optical field therefrom. Such optical property alterations may include: refractive index variations or modulations in, on, and/or near an optical element or a waveguide medium; trenches or grooves etched into one or more surfaces of an optical element or a waveguide structure (core and/or cladding); ribs extending out from one or more surfaces of an optical element or a waveguide structure (core and/or cladding); metallic, dielectric, multi-layer, and/or other coating elements in, on, or near an optical element or a waveguide structure (core and/or cladding); and/or other one or more altered optical properties in the interior, on the surface(s), or in the proximity of an optical element or a waveguide active to diffract, reflect, and/or scatter incident light. In one- or two-dimensional waveguide-based diffractive structures, diffractive elements may include generalized curves active to diffract, reflect, and/or scatter a portion of an incident optical field. In three-dimensional diffractive structures, diffractive elements may include generalized surfaces having one or more altered optical properties so as to diffract, reflect, and/or scatter a portion of an incident optical field. In diffraction-grating-type diffractive structures, diffractive elements may include grating lines and/or grooves (full and/or partial) having one or more altered optical properties so as to diffract, reflect, and/or scatter a portion of an incident optical field. A set of diffractive elements is spatially defined with respect to a set of diffractive element virtual contours.

Diffractive Element Virtual Contour Set: A set of virtual lines, curves, or surfaces that serve as a spatial reference for defining a set of diffractive elements. Most typically, a virtual contour set is arranged so that if the diffracting regions of the corresponding diffractive elements were to spatially coincide with the virtual contours, then the resulting superposition of corresponding diffracted components of an incident optical field at a design wavelength would exhibit maximal constructive interference at the exit port. A virtual contour set is a generalization of the set of uniformly spaced parallel lines that spatially define the grooves of a standard diffraction grating. It should be noted that the virtual contour set is not physically present in the distributed optical structure, but serves as a spatial reference for defining the diffractive elements of the distributed optical structure.

Field Amplitude: The peak value of an oscillatory field interactive with a distributed optical structure. Interactive fields may include input and output fields. Field amplitude may be a function of wavelength, position, and/or propagation direction.

Field Phase: The difference in oscillatory phase of an interactive oscillatory field compared to a reference oscillatory field as a function of wavelength, position, and/or propagation direction.

Diffractive Element Transfer Function: A function of wavelength, position, and/or propagation direction relating the field amplitude and field phase of an optical field diffracted, reflected, and/or scattered from a single diffractive element to the field phase and field amplitude of an optical field incident on the diffractive element.

Collective Transfer Function: Alternatively, distributed optical transfer function, overall transfer function, overall set transfer function, diffractive element set transfer function, device transfer function, port-to-port transfer function, and so forth. A function of wavelength, position, and/or propagation direction relating the field amplitude and field phase of an optical field diffracted, reflected, and/or scattered from a distributed optical structure (comprising two or more constituent diffractive elements) to the field phase and field amplitude of an optical field incident on the distributed optical structure. In the limit of weak diffraction by each element (so that multiple diffractions can be neglected), such a collective transfer function is typically a coherent superposition of the diffractive element transfer functions of the constituent diffractive elements. In cases where the diffraction by each element is sufficiently strong (so that multiple diffractions cannot be neglected), the relationship between the various element transfer functions and the collective transfer function will be more complicated.

Apodization function: A function relating amplitude and/or phase of an optical field diffracted, reflected, and/or scattered from a single diffractive element within a diffractive element set to the position of the element within the diffractive element set along a propagation direction of the optical field. In general, a collective transfer function may be thought of as a coherent superposition of normalized, in-phase diffractive element transfer functions, with the apodization function providing the (in general) complex-valued coefficients of the superposition.

Planar Waveguide: Alternatively, a two-dimensional waveguide. Any transmissive structure of relatively large extent in two dimensions and relatively thin in a third dimension whose boundary reflection properties lead to substantial confinement of certain optical fields propagating nearly parallel to the structure's extended directions (i.e., substantial confinement in one transverse dimension). A planar waveguide may be flat or curved according to whether the thin dimension corresponds to a substantially fixed spatial direction or a position-dependent spatial direction, respectively.

Channel Waveguide: Alternatively, a one-dimensional waveguide. Any transmissive structure of relatively large extent in one dimension and relatively thin in the remaining two dimensions whose boundary reflection properties lead to substantial confinement of certain fields propagating nearly parallel to the structure's single extended direction (i.e., substantial confinement in two transverse dimensions). A channel waveguide may be straight or curved according to whether the thin dimensions correspond to substantially fixed spatial directions or position-dependent spatial directions, respectively.

Fill Factor: A number between 0 and 1 representing the fraction of a predefined line, curve, surface, and/or other virtual contour that is marked, scribed, or otherwise altered in some manner to form one or more diffracting regions. For a curvilinear virtual contour, the fill factor may be determined by the sum of the lengths of all altered (i.e., diffracting) segments of the virtual contour divided by the total virtual contour length. For a surface virtual contour, the fill factor may be determined by the sum of the surface areas of all altered (i.e., diffracting) surface areal segments of the virtual contour divided by the total virtual contour surface area.

Fill Distribution: a function of position on a virtual contour indicating whether a given point on the virtual contour has been altered or not to form a diffracting region. Integrated over an entire virtual contour, the fill distribution would yield the fill factor (see above). Integrated over a region of the virtual contour, the fill distribution may be interpreted as defining a "local fill factor" for the region.

Optical Port: A structurally and/or functionally defined region of space through which an optical field enters or exits an optical device, characterized by position and/or propagation direction. For example, incident and diffracted angles relative to a diffraction grating would be an example of a functionally-defined optical port defined by propagation direction, while an end face of a channel waveguide would be an example of a structurally-defined optical port defined by position. A given optical device may have one or more ports, and any given port may function as an entrance optical port, an exit optical port, or both.

Exemplary Diffractive Element Geometries

Consider the substantially flat exemplary planar waveguide structure shown in FIG. 1. A plane containing one boundary (upper or lower) of the planar waveguide is spanned by the x and y coordinates. The waveguide structure occupies a certain region of the xy plane and has a thickness $\Delta z$ which is substantially constant except for thickness variations that may be associated with diffractive elements. The thickness $\Delta z$ is typically 4 to 8 times the in-medium design wavelength of the device but can be less (provided that propagating waveguide field modes are nevertheless supported by the planar waveguide) or greater (provided that modal dispersion does not appreciably broaden the spectral response of relevant distributed optical structures). At typical telecommunication wavelengths ($\lambda_{air}$~1.5 $\mu$m), the thickness of the planar waveguide may be about 6 $\mu$m if the waveguide medium is silica. In the exemplary embodiment of FIG. 1, light enters the planar waveguide through optical port 101 (via a channel waveguide, edge mounted fiber, surface grating coupler, free space propagation, or any other suitable optical input means), propagates within the planar waveguide (in this example expanding in region 110), encounters distributed optical structure 123, and diffracts from diffractive elements 103. The diffractive elements 103 are positioned and adapted so that diffracted light in region 112 possesses field amplitude/phase well-suited for transmission through optical port 102, through which light may exit the device and propagate away (by free space propagation or propagation through a channel waveguide, butt-coupled fiber, surface grating coupler, or any other suitable optical coupling device). The virtual contours of individual diffractive elements 103 in the xy plane may preferably chosen so as to collectively transform the field amplitude/phase of the input signal to be optimally suited for transmission through output port 102. The diffractive elements, considered collectively, comprise a hologram with powerful field amplitude/phase mapping and/or spectral filtering capability through the collective transfer function of distributed optical structure 123. The diffractive elements 103 are shown in this example as simple circular arcs having a common center 105, which is approximately midway between the optical ports 101 and 102. Circular arcs may not necessarily provide optimal mapping of the input field amplitude/phase onto the output optical port. More generally, the diffractive elements 103 may comprise virtual contours more complex than simple conic sections.

Figure 2:
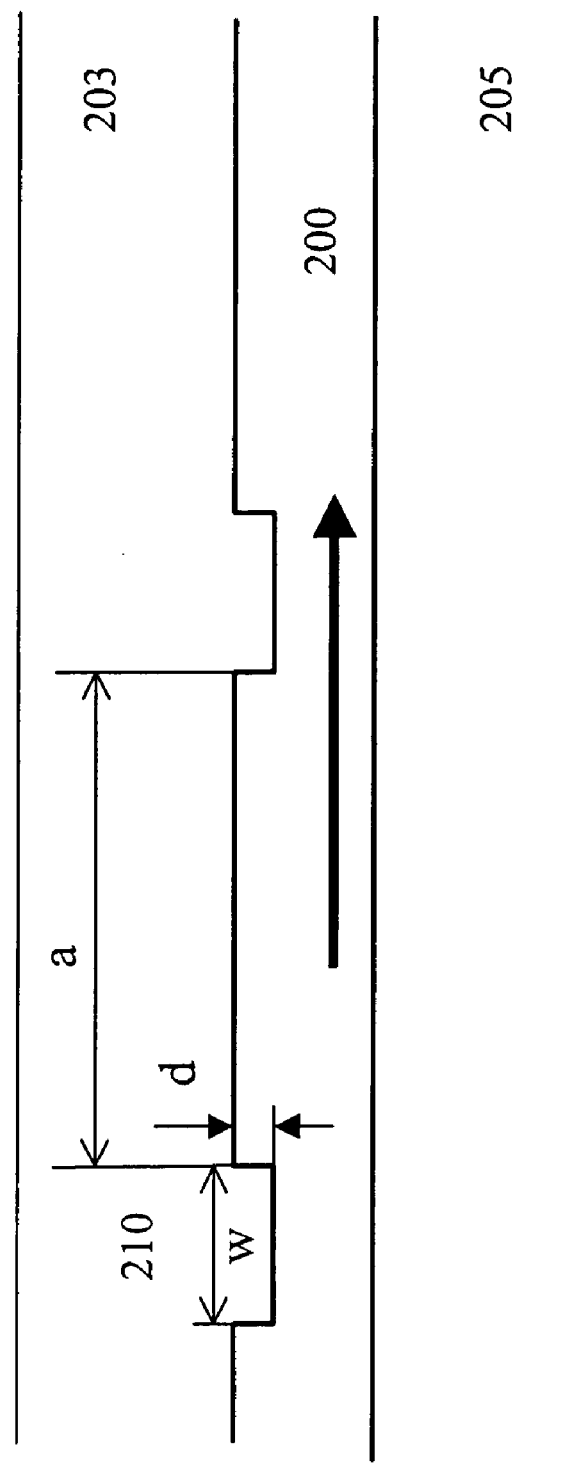
FIG. 2 is a cross-sectional view of a pair of individual diffractive elements of a distributed optical device.

An enlarged cross sectional view of an exemplary planar waveguide structure including two of the individual diffractive elements is shown in FIG. 2. The cross sectional plane of FIG. 2 is parallel to the z direction and contains the point 105 in FIG. 1. In FIG. 1, the actual structure of the diffractive elements is not resolved and they appear simply as lines 103. In the exemplary case of FIG. 2, the diffractive elements comprise trenches etched or otherwise scribed into one surface of the planar waveguide core 200. Typically, but not necessarily, the region above and below the waveguide core 200 is filled with a transparent dielectric material, upper cladding 203 and lower cladding 205, having an index of refraction that is smaller than that of core 200. Input fields incident on the distributed optical structure are primarily localized in the core 200. Alternatively, the diffractive elements may comprise: bulk index of refraction changes in the core and/or cladding layers; index of refraction variations, modulations, and/or discontinuities created internal to the planar waveguide during fabrication by lithographic or other means; rib-like structures extending from the waveguide plane, including in the limit of very short ribs metallic and/or dielectric coating elements; and/or any structural element active to diffract, reflect, and/or scatter a portion of the input field.

A diffractive element trench shown, 210, has a width w and a depth d in the planar waveguide core 200. It would be useful to have the ability to independently vary the depth of the various diffractive elements (and/or the shapes of the trenches) since such ability would provide for independent control of the relative diffractive amplitudes of the individual diffractive elements (i.e., control of the amplitude apodization function). However, depth/shape control within a single distributed optical structure creates significant fabrication challenges. Similarly, heights/shapes of protruding ribs or the magnitudes/profiles of index modulations could also provide diffracted amplitude control for individual diffractive elements, but also introduce significant fabrication challenges.

The present invention includes apparatus and methods for controlling the diffractive scattering amplitude and/or phase of individual diffractive elements (i.e., control of the apodization function), while mitigating fabrication difficulties. A preferred technique is referred to herein as partial-fill gray scale. Another preferred technique is referred to herein as width-based gray scale. Another preferred technique is referred to herein as proportional-line-density gray scale. Another preferred technique is referred to herein as facet-displacement gray scale. Another preferred technique is referred to herein as element-displacement gray scale. Some aspects of these techniques have been disclosed in above-cited: provisional App. No. 60/315,302 by Mossberg; provisional App. No. 60/370,182 by Mossberg and Greiner; non-provisional application Ser. No. 10/229,444 by Mossberg and Greiner; provisional App. No. 60/468,479 by Greiner, Iazikov, and Mossberg; and provisional App. No. 60/486,450 by Greiner, Iazikov, and Mossberg. It should be noted in the ensuing discussion that any references to partial scribing of trench- or groove-like diffractive elements may be equivalently applicable to partial fabrication, alteration, and/or impression of protruding, rib-like, index-modulated, and/or other types of diffractive elements.

Partial-Fill Gray Scale

The instantaneous output signal generated at a particular position by a distributed optical structure such as that shown in FIG. 1 contains contributions from the light scattered from each point along the length of each diffractive element. The net contribution made by a particular diffractive element to the output signal at a particular time and position may be regarded to be the spatial integral of the product of the diffractive element amplitude at each point along its virtual contour and the amplitude of the input field that was incident on the diffractive element point a propagation time earlier. In computing the aforementioned integral, optical phase must be taken into account. In cases where all points on a diffractive element virtual contour contribute with essentially the same phase, as for example at the output port 102 in FIG. 1, the integral nature of the diffractive element contribution to the output field allows amplitude control from an individual diffractive element through control of the fraction of the nominally continuous virtual contour that is actually scribed, index-modulated, fabricated, or otherwise altered to form one or more diffracting regions. In situations where various points along a diffractive element virtual contour contribute with position-dependent phases, the net amplitude of the diffractive element may still be controlled by selectively altering only portions of the diffractive element virtual contour to form one or more diffracting regions. In such cases, however, the relationship between amplitude and fill factor (of the alteration) becomes more complex and detailed consideration of the destructive or constructive nature of the contribution from each virtual contour point must be taken into account.

Figure 3:
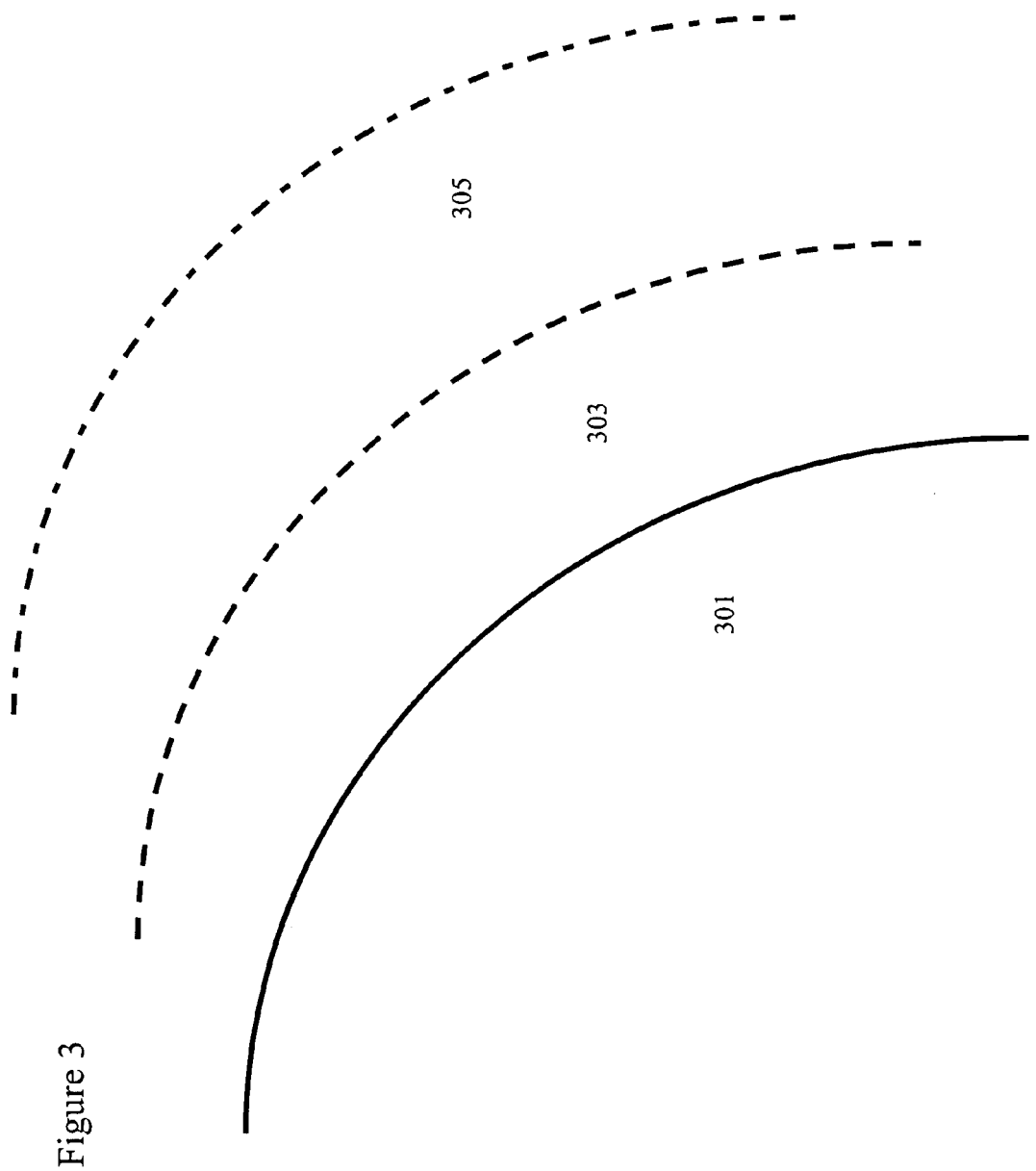
FIG. 3 illustrates schematically diffractive elements having differing fill factors.

FIG. 3 exemplifies diffractive element amplitude control by partial virtual contour scribing in the case that the entire virtual contour contributes to the output signal with essentially constant phase. In FIG. 3, three different diffractive elements having similar virtual contours but with three different fill factors and/or distributions are depicted. In diffractive element 301, 100 percent of the diffractive element virtual contour is altered (as indicated by the continuous dark line) by creating a trench, for example. In diffractive element 303, portions of the diffractive element virtual contour are not scribed (indicated by the breaks in the dark line). The net amplitude of diffractive element 303 compared to that of diffractive element 301 is given by the ratio of their integrated contributions to the output signal. Ignoring spatial variations in the input signal, the relative diffractive amplitudes of elements 301 and 303 are in proportion to their fill factors (i.e., in proportion to the fraction of the virtual contour altered to form one or more diffracting regions). The exact ratio of the diffractive amplitudes of the elements is influenced by the spatial variation of the input field and is given by the ratio of the integrals of diffractive element amplitude multiplied by local input field amplitude along the respective diffractive element virtual contours. When the diffractive elements are finely divided into many diffracting regions so that the input field amplitude is relatively constant over successive virtual contour portions, the relative diffractive element amplitudes are reasonably approximated simply by the fill factors of respective diffractive elements.

Diffractive element 305 has yet a different fill distribution and factor. By controlling the fraction of a given diffractive element virtual contour that is scribed or otherwise written with a trench, rib, or other scattering mechanism to form one or more diffracting regions, one can continuously control the effective amplitude of the diffractive element, thereby enabling realization of virtually any desired amplitude apodization function. Note that partial scribing of the diffractive element virtual contour provides effective amplitude control without changing diffractive element height/depth, cross-section, shape, or structure. If etched trenches or ribs are utilized as diffractive elements, partial diffractive element virtual contour filling provides a means of achieving control over diffractive element amplitude without requiring control over etch depth or width, thereby vastly simplifying fabrication. Trenches or ribs of fixed cross-section can be written or not written in binary fashion along the diffractive element virtual contour, which is easily accomplished with standard lithographic techniques. Control of etch depth to different levels on a single planar waveguide to control diffractive element amplitude is lithographically challenging. Partial-fill gray scale provides a solution to diffractive element amplitude control that does not require etch depth variation within the distributed optical structure. Controlled variation of etch depth may nevertheless be used in combination with partial-fill gray scale. It should be noted that fill patterns used in the control of net diffractive element amplitude may include randomness in order to suppress constructive interference in undesired output areas. If the fill pattern is regular, cases may arise where grating type effects lead to undesired output signal orders. However, such additional output signal order from a regular fill pattern may be exploited for providing additional device functionality.

The partial-fill gray scale apparatus and methods according to the present invention may be employed in any diffractive device or structure where output signals derive from extended sources either in the form of a curvi-linear virtual contour or a surface virtual contour. Partial population (i.e., partial filling) of the virtual contour with a scattering, reflecting, or diffracting mechanism to form one or more diffracting regions provides a simple approach to controlling the relative output amplitude from that virtual contour compared to other virtual contours (controlling the amplitude apodization function on an element-by-element basis). Partial-fill gray scale may be implemented with smoothly varying diffractive element amplitude as well as binary scribing and non-scribing.

Figure 4:
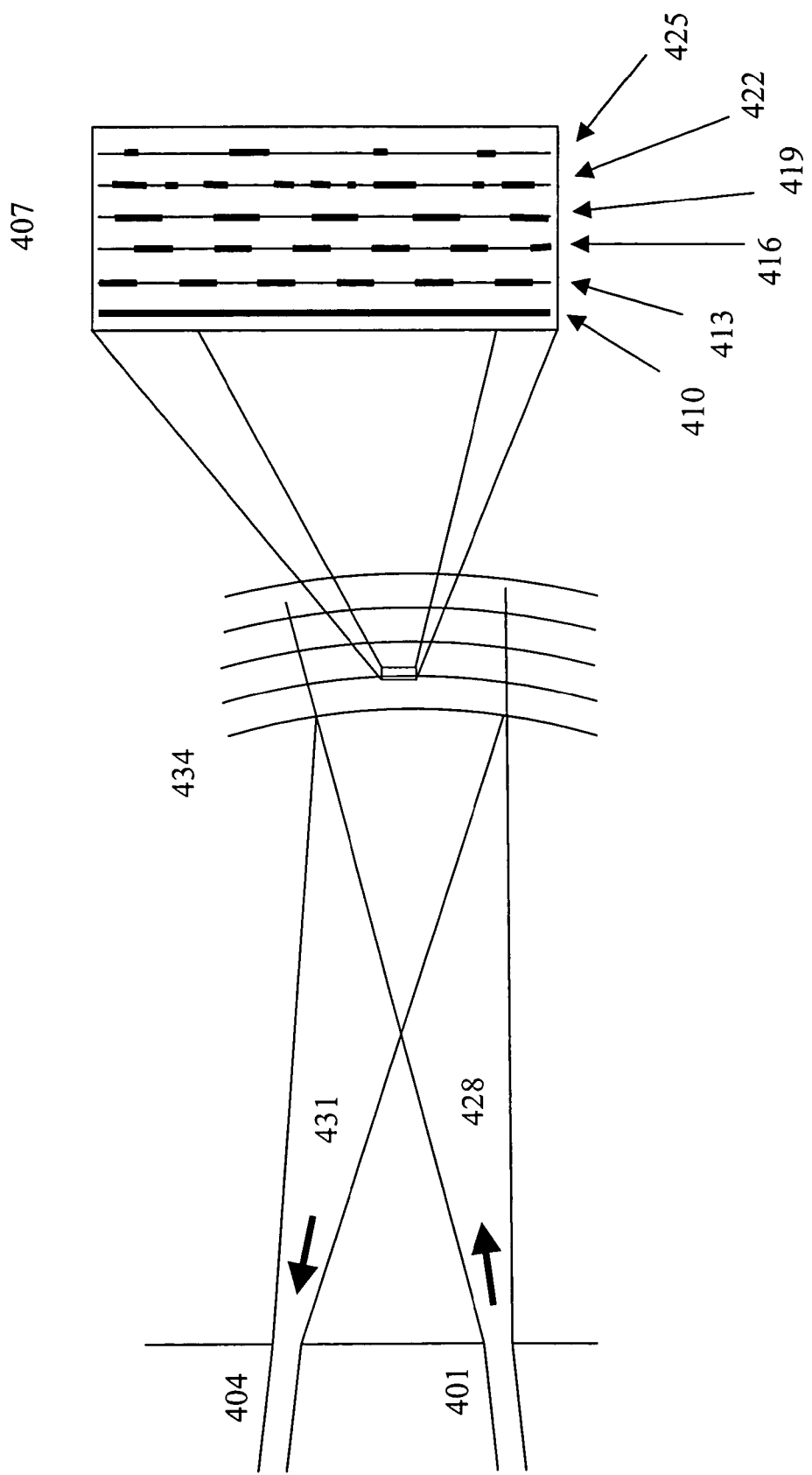
FIG. 4 is a schematic diagram of a two-port distributed optical device implemented in a planar optical waveguide.

FIG. 4 shows an exemplary embodiment of the present invention comprising a two-port planar waveguide. In this example, partial-fill gray scale is used to create diffractive elements of various effective amplitudes in a planar waveguide two-port filter device. FIG. 4 is a top view of the two-port planar waveguide device and fields propagate substantially within the plane of the Figure. Light may enter the device through an input port 401 (from an input channel waveguide in this example) and expands in region 428 of the planar waveguide before encountering distributed optical structure 434. Distributed optical structure 434 comprises two or more diffractive elements, typically many diffractive elements (potentially ranging between 2 elements and $10^6$ elements; on the order of $10^3$–$10^4$ elements may be employed in typical devices). Individual diffractive elements are too small to be seen in the overall view of the distributed optical structure and typically have a separation of an integer number of half wavelengths of a reflected field (wavelength inside the planar waveguide medium). The diffractive elements collectively generate an output signal which converges through region 431 of the planar waveguide and exits the device through output port 404 (into an output channel waveguide in this example). The spatial patterning of the diffractive element virtual contours in the distributed optical structure may be configured for generating an output signal spatially well-matched to the output port 404. An enlarged diagram, 407, showing individual diffractive elements within the distributed optical structure is also shown. In this exemplary embodiment where the input signal is optical radiation of vacuum wavelength 1.54 microns, the diffractive elements consist of trenches of about 0.25 micron width and 0.4 micron depth etched into one surface of the planar waveguide core using standard lithographic techniques. The planar waveguide of the exemplary embodiment may comprise silica-based core and cladding layers, but may alternatively consist of polymer, silicon, III–V semiconductors, other semiconductors, or any other suitable medium transmissive to the input field employed.

Individual diffractive element virtual contours are preferably configured to optimally direct a portion of the incident optical field onto the output port. To control relative diffractive amplitudes of the individual elements, differing fractions and distributions of each of the diffractive element virtual contours are scribed with trenches to form one or more diffracting regions. Virtual contour 410 corresponds to a diffractive element that has maximal (unity) relative amplitude and is therefore scribed with a trench over its entire length. Virtual contours 413, 416, 419, and 422 all correspond to diffractive elements having relative amplitude of about 0.5. In each case, 50 percent of the virtual contour length is scribed with a trench. The length of individual scribed segments (i.e., diffracting regions) is widely variable, a lower limit being determined primarily by lithographic resolution and an upper limit being determined primarily by the input field width. However, dependence of individual diffractive element amplitude on the input field spatial distribution can be avoided by employing a number of diffracting segments across the input beam width comparable or greater than the number of gray scale resolution levels desired (e.g. at least 50 scribed or unscribed segments to achieve 50-level gray scale).

Additional aspects applicable to the present invention are apparent from more detailed consideration of diffractive elements 413, 416, 419, 422, and 425. It will be noted that diffractive elements 413 and 416 are scribed with substantially identical regular patterns, having substantially equal-length segments of scribed and unscribed virtual contour segments (resulting in a fill factor of about 0.5). It will be further noted that the scribed segments (i.e., diffracting regions) of diffractive element 416 are laterally displaced from those of diffractive element 413. Considering diffractive elements 413 and 416 together, their combined scribed sections essentially uniformly span the transverse extent of the input field. Implementations of the present invention may typically ensure that any given portion of the input field spatial distribution "sees" about the same number of scribed (or otherwise diffracting, reflecting, and/or scattering) segments as it propagates into distributed optical structure 434, by including suitably laterally offset scribed portions of the diffractive element virtual contours. Such usage of partial-fill gray scale may ensure that the scribed portions of the set of diffractive elements comprising the distributed optical structure essentially uniformly span the transverse spatial distribution of the input field. Such arrangement of scribed diffracting segments may substantially reduce insertion loss by reducing the fraction of the input field distribution that may propagate through the distributed optical structure without interaction with a scribed diffractive element segment. Such arrangement of scribed sections is of lessening importance as the size of gaps between scribed sections decreases. With smaller gaps between scribed sections, diffraction begins to couple the input field into shadowed regions behind scribed sections of diffractive elements.

Diffractive element 419 also has a fill factor of about 0.5 (i.e. trenches are scribed on about 50 percent of the diffractive element virtual contour, and, like diffractive elements 413 and 416, has spaces and trenches of substantially equal length). However, the scribed and unscribed segments of diffractive element 419 are of a different length than is the case for elements 413 and 416 (i.e. element 419 has a fill pattern of a different periodicity). Such a mixture of trench fill patterns having differing periodicities is advantageous as a means for reducing coherently scattered light in unwanted output directions. Conversely, ordered arrays of diffractive elements having the same periodicity may be employed for generating multiple output signals through multiple output ports through coherent scattering. Diffractive element 422 illustrates an alternative means for reducing coherent scatter in unwanted output directions. The trenches comprising diffractive element 422 have irregular lengths and separations, while maintaining an overall fill factor of about 0.5. The irregular fill pattern minimizes coherent scattering in unwanted output directions. As a final example, diffractive element 425 has a fill factor of about 0.2 and an irregular fill pattern. The relative diffractive amplitude of element 425 is approximately 0.2.

It may be desirable to vary the fill factor along a given virtual contour (i.e., vary 9 the local fill factor), thereby varying the diffracted amplitude as a function of position along the virtual contour. This additional degree of freedom may be exploited, for example, to flatten out a non-uniform incident field distribution. An incident field distribution with relatively larger amplitude in the center and relatively smaller amplitude at the periphery, for example, may be transformed into a more uniform field amplitude distribution by diffractive elements having smaller fill factors near the center and larger fill factors near the periphery. Other such scenarios may be readily implemented.

Diffractive elements need not be trenches. They may be any structural element, constituent, and/or optical property alteration active to diffract, reflect, and/or scatter a portion of the input field and may comprise trenches, ribs, or other suitable type of refractive index variation on or near one or both of the waveguide surfaces, and/or within the waveguide interior. Suitable diffractive elements may comprise: bulk index of refraction changes in the core and/or cladding layers; index of refraction variations, modulations, and/or discontinuities created internal to the planar waveguide during fabrication by lithographic or other means; groove- or trench-like structures in, on, or near the waveguide; rib-like structures extending from the waveguide plane, including in the limit of very short ribs metallic and/or dielectric coating elements; and/or any structural element active to diffract, reflect, and/or scatter a portion of the input field. The present invention may be implemented with continuous variations in local diffractive element amplitude rather than the discrete variations described in this exemplary embodiment.

Figure 5:
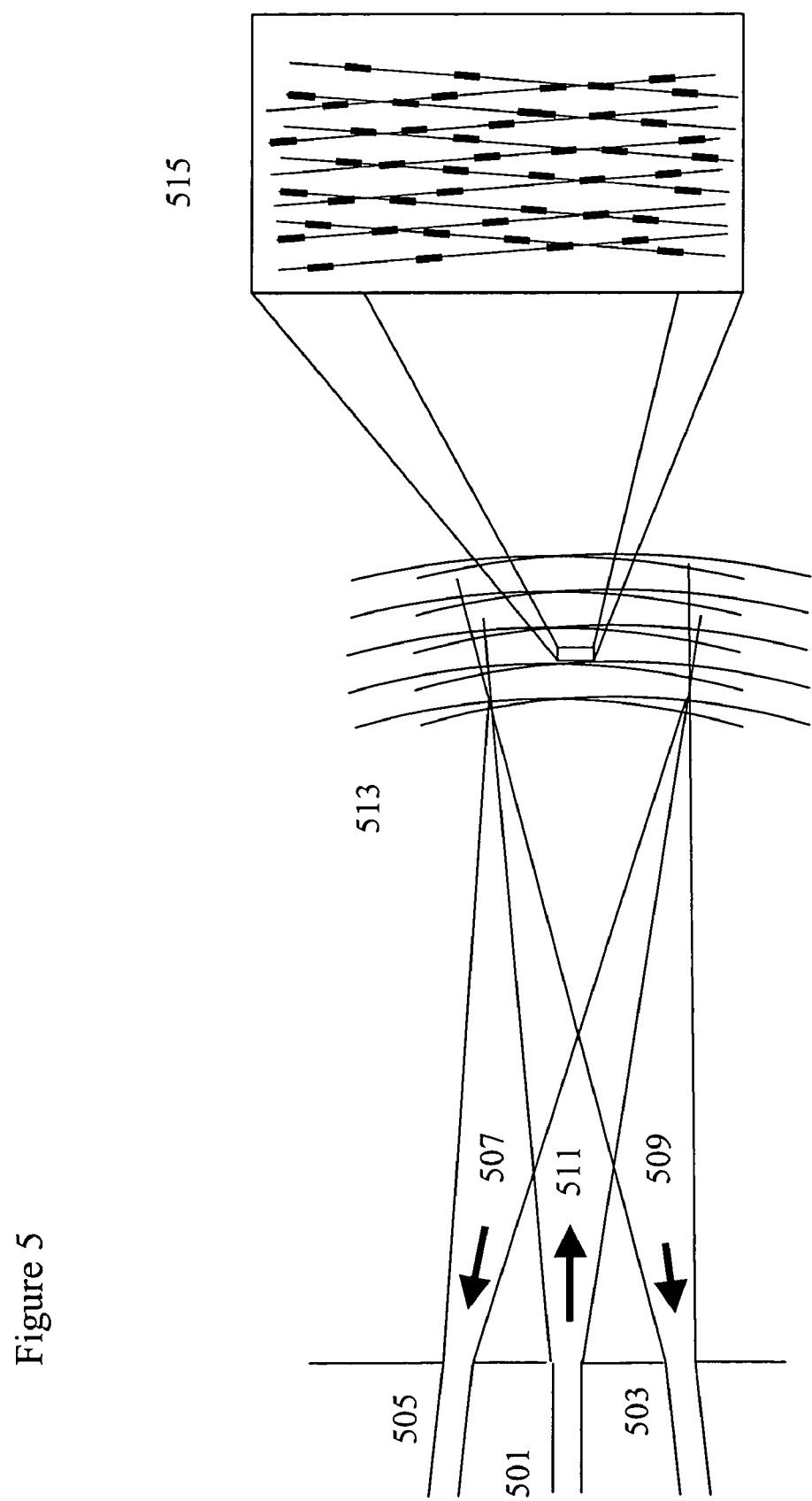
FIG. 5 is a schematic diagram of a three-port distributed optical device implemented in a planar optical waveguide.

A three-port exemplary embodiment of the present invention is depicted in FIG. 5. In this embodiment, partial-fill gray scale construction of diffractive elements is employed in the fabrication of a planar waveguide dual-component distributed optical structure which is comprised of two distributed optical structures (implemented as described hereinabove), each of which provides a separate spatial and spectral transfer function. In the embodiment of FIG. 5, an input field enters via input port 501 (through a channel waveguide, butt-coupled fiber, or any other suitable coupling means). The input field expands in region 511 of the planar waveguide and encounters the dual-component distributed optical structure 513. The dual-component distributed optical structure consists of two separate sets of diffractive elements, a first component set and a second component set. The first set of diffractive elements directs light from the input field to create a first output field which propagates through region 509 to a first output port 503, which may be any suitable type of output port. The first output field is related to the input field via a first spatial and spectral transfer function characteristic of the first component set of diffractive elements. The second set of diffractive elements directs light from the input field to create a second output field which propagates through region 507 and exits through output port 505, which may be any suitable type of output port. The second output field is related to the input field via a second spatial and spectral transfer function characteristic of the second set of diffractive elements. The first and second set of diffractive elements will generally overlap in some regions of the distributed optical structure.

The transfer functions of the first and second distributed optical structures are each preferably arranged so as to be substantially unaffected by the presence of the other distributed optical structure. This would typically not be the case if written segments of diffractive element virtual contours from each of the structures overlap. To avoid alteration of the transfer functions of the two sets of diffractive elements in regions where they overlap, some or all of the diffractive element virtual contours are preferably written with a fill factor less than unity, and the written segments (i.e., diffracting regions) arranged so as not to overlap one another. This is illustrated in the enlarged portion of FIG. 5, where diffractive elements 515 are shown having a fill factor of about 0.25. By suitably positioning written segments of the diffractive elements to substantially avoid overlap, the spectral and spatial transfer function of the first set of diffractive elements exhibits essentially the same form it would have in the absence of the second set of diffractive elements and likewise for the spatial and spectral transfer function of the second set of diffractive elements. Additional sets of diffractive elements active to couple the input port to additional output ports with characteristic spatial and spectral transfer functions may be additionally overlaid. The average fill factor of each set of diffractive elements is preferably adjusted as necessary to substantially eliminate overlap of written virtual contour segments. Partial-fill grayscale according to the present invention provides for the variation of relative diffractive element amplitude within a particular set of overlaid diffractive elements. Maximal diffractive element amplitude within a set of diffractive elements is preferably assigned a partial-fill factor that is less than unity by an amount sufficient to substantially reduce or eliminate overlap of written virtual contour segments. Other diffraction elements within the set having smaller amplitudes are assigned proportionally smaller fill factors.

Figure 6:
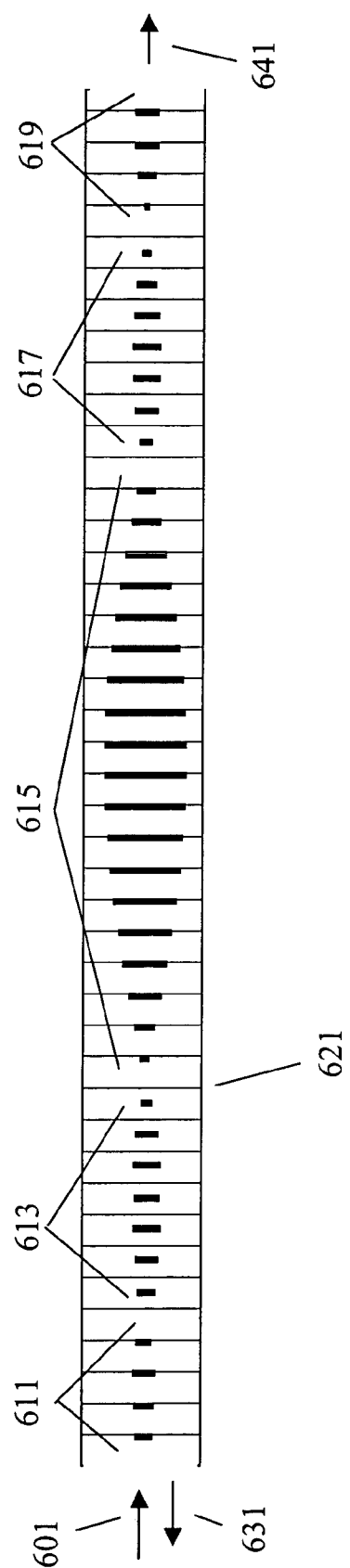
FIG. 6 is a schematic diagram of a distributed optical device implemented in a channel optical waveguide.

In channel waveguides, the diffractive elements comprising distributed optical structures are typically shorter (in transverse extent) since the input beam is confined in both transverse dimensions. The partial-fill gray-scale approach to controlling relative diffraction element amplitude may nevertheless be employed in a channel waveguide. An exemplary implementation of the present invention in a channel waveguide is schematically represented in FIG. 6, which shows a portion of a channel waveguide containing a distributed optical structure where partial-fill grayscale has been employed for relative diffractive element amplitude control. Input fields propagate from an input port 601 at the left end of the waveguide and encounter the distributed optical structure. The interaction of the input field with the distributed optical structure may generate a transmitted output field propagating forward through output port 641, and/or a back-reflected output field propagating backward through output port 631 (equivalent to input port 601 in this example). The channel waveguide is shown with a set of substantially uniformly spaced reference lines 621, which are preferably separated by one half of an in-guide reflected wavelength that would be produced by a distributed optical structure comprised of diffractive elements coincident with the reference lines.

The written segments (i.e., diffracting regions) of groups 611, 613, 615, 617, and 619 comprise the diffractive elements of the distributed optical structure. The diffractive elements may comprise any structural element, constituent, and/or alteration active to scatter a portion of the input field, and may specifically comprise trenches or ribs or other refractive index discontinuities or alterations in and/or near the channel waveguide boundaries and/or its interior, including diffractive elements recited elsewhere herein. The relative amplitudes of the various diffractive elements shown in FIG. 6 are controlled by varying their transverse extents to follow an approximate sinc function (i.e., sin(x)/x). However, the present invention is in no way limited to any specific pattern of diffractive element amplitude variation. Negative values of the sinc function are accommodated by introducing a spatial shift in the longitudinal position of the corresponding diffractive elements. Diffractive elements 613 and 617 therefore represent negative regions of the sinc function and are shifted by one half of the reference line spacing (i.e., one-quarter of the in-guide wavelength of the reflected wavelength). More generally, arbitrary relative phase shifts between the diffractive elements (i.e., a phase apodization function) may be achieved by introducing longitudinal position shifts (using the linear relationship between spatial and phase shifts given by 180 degrees per quarter in-guide wavelength). Stated another way, the relative phase of the signal generated by an individual diffractive element may be phase shifted by an amount $\phi$ radians by keeping all aspects of the diffractive element the same and shifting its center by an amount $\Delta a = (\lambda/4\pi n_1)\phi$, where $\lambda$ is the operative free-space wavelength and $n_1$ is the effective waveguide refractive index.

This approach to phase shifting applies generally to any distributed optical structure, and is not limited to channel waveguides. In this channel waveguide exemplary embodiment, partial-fill grayscale is implemented by writing each diffractive element as a single written segment (i.e., diffracting region) whose written length (i.e., transverse extent) is controlled. More generally, each diffractive element may include multiple written segments or single written segments with spatially varying local amplitude. The relative amplitude of each diffractive element is determined by two factors. One is the integrated product of the local diffractive element amplitude times the local input field amplitude integrated over the length of the diffractive element. Since the input field will typically vary significantly across the channel waveguide, such variation need be taken into account in choosing the transverse extent of diffracting region(s) along the diffractive elements. An additional factor controlling the relative diffractive element amplitude as it pertains to the back reflected field is the overlap integral between the element's back-diffracted field and the back-directed mode of the waveguide.

Figure 7:
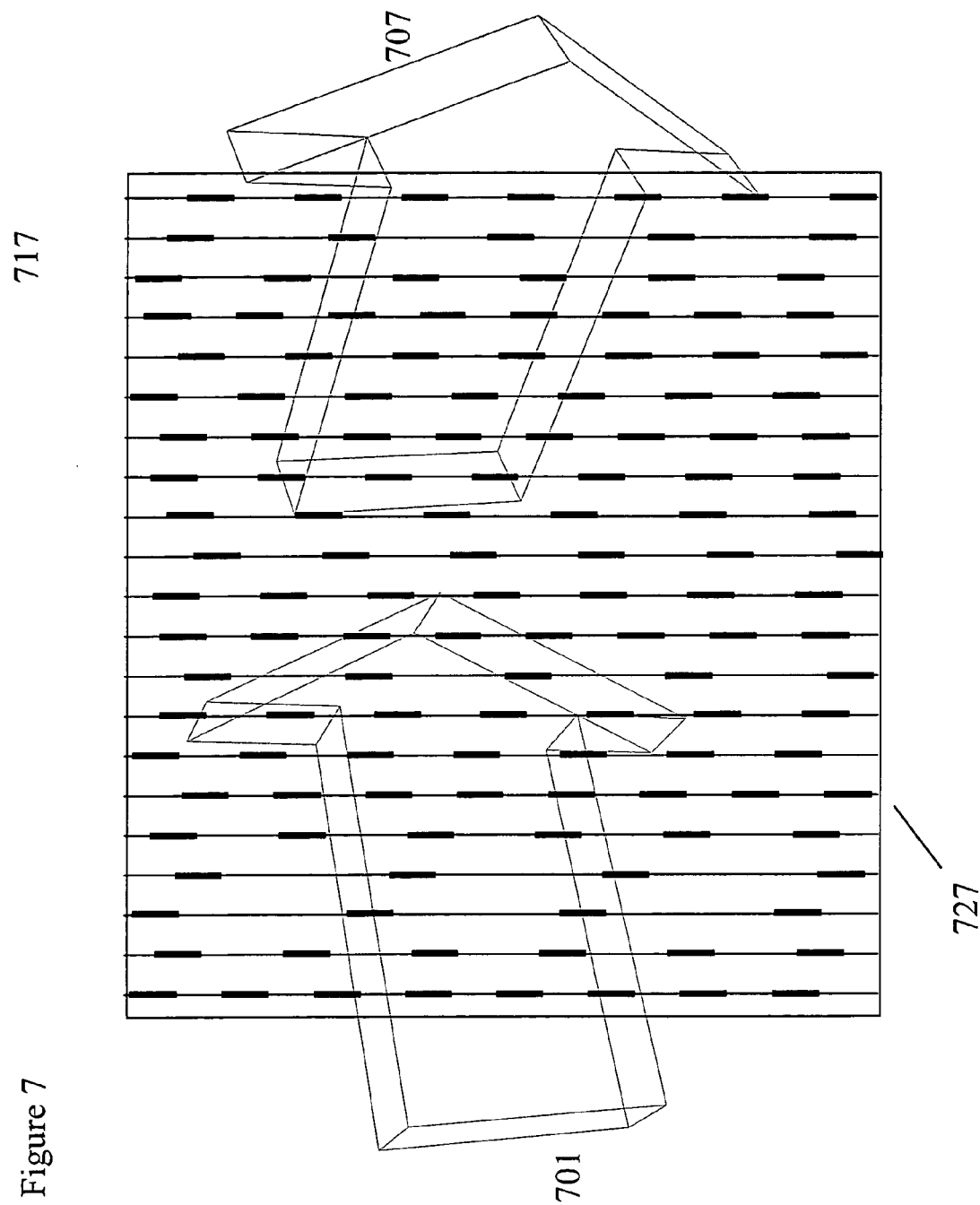
FIG. 7 is a schematic diagram of a distributed optical device implemented as an optical surface grating.

Another exemplary embodiment of the present invention is shown in FIG. 7, which depicts a diffraction grating comprising diffractive elements with various fill factors. The diffractive elements 727 lie within or on a surface and in the present example comprise essentially parallel virtual contours. An input field propagates toward the surface of diffractive elements through input port 701 (here defined functionally, primarily by an input propagation direction), while the resulting diffracted output field propagates away from the surface of diffractive elements through output port 707 (also defined functionally primarily by an output propagation direction). The surface containing the diffractive elements may be substantially planar or of a more complex geometry. The diffraction grating may comprise a surface grating or a volume grating, and may comprise a reflection grating and/or a transmission grating. The diffracting region(s) on the diffractive elements may be: grooves, such as ruled marks, etched trenches, etched ribs, and/or holographically defined grooves; index discontinuities, variations, and/or modulations; metallic and/or dielectric coatings spatially-selectively applied, altered, and/or removed; and/or other suitable structural features or alterations active to diffract, reflect, and/or scatter portions of the input field. In this embodiment, the diffractive elements have various fill factors and have fill patterns including various numbers of fixed length written segments per unit length along the diffractive element virtual contours. Other fill patterns may be equivalently employed. The control over relative diffractive amplitude of the various diffractive elements provides for the control over the spatial and spectral transfer function of the surface distributed optical structure. The relative amplitude of each diffractive element is proportional to the integral of the local diffractive element amplitude times the local input field amplitude integrated over the diffractive element virtual contour. Partial fill of the diffractive element provides for broad control of this amplitude. In order to make the relative diffractive element amplitudes relatively insensitive to the profile of the input field, the length employed for scribed segments should be chosen small compared to the minimum anticipated input field distribution. A diffracted output field may be generated on the same side of the surface distributed optical structure as the input field (reflection grating) and/or on the opposite side (transmission grating). In either case, partial fill grayscale diffractive elements enable the detailed tailoring of the spectral transfer function of the output field(s).

Width-Based Gray Scale

A second method for controlling diffractive element scattering amplitude, or the amplitude apodization function, according to the present invention includes controlling the width, w, (equivalently, the thickness) of individual diffractive elements. The width or thickness of diffractive elements is easily controlled using standard contact and projection lithography, using stamping or embossing based fabrication, or by other spatially-selective fabrication methods.

The cross sectional profile of a single trench-type diffractive element 801 is shown in FIG. 8. Light incident through the waveguide 807 produces a reflected signal 809 from the front surface of the diffractive element and a reflected signal 811 from the back surface of the diffractive element. The two reflected signals add together coherently to create the net signal reflected (diffracted) back from the diffractive element. The phase difference of reflections 807 and 809 depends on the thickness of the diffractive element, w, and on the refractive index, $n_2$, of the diffractive element. In the limit that $n_1 \approx n_2$, the amplitude of the front and back surface reflections is essentially equal and the net reflected signal varies approximately as $\sin(2\pi n_2 w/\lambda)$, where $n_2$ is the refractive index within the diffractive element trench, w is the total width of the diffractive element, and $\lambda$ is the free space design wavelength. The net reflected signal amplitude exhibits a similar sinusoidal variation when $n_1$ and $n_2$ are significantly different from each other. However, depletion of the input signal by the front surface reflection prevents exact cancellation of the net reflection when the reflected components destructively interfere. When w is equal to approximately one quarter of the in-medium design wavelength the scattering amplitude is maximal. The scattering amplitude has the same maximal magnitude for each in-medium half wavelength ($\lambda/2n_2$) increase in the width. If the central position of the trench 805 is held fixed as the trench width is changed and $n_1 \approx n_2$, changes in diffractive element width lead to negligible phase changes in the diffracted signal. Phase changes are on the order of $2\pi(n_2-n_1)\Delta w/\lambda$, where $\Delta w$ is the width change. If $n_2-n_1 \approx 0.01$ and $\Delta w \approx \lambda/4n_2$, changes in reflected signal phase with changes in diffractive element width can be neglected for many purposes. It is clear that large changes in the scattering amplitude of a specific diffraction element can be achieved by controlling its trench width. While trench-like geometry has been described for specificity, considerations essentially identical follow for rib-type diffractive elements and indeed for any diffractive element comprising a front and back index discontinuity, variation, or modulation. In the case of irregular optical property spatial profiles, detailed simulation or empirical calibration are necessary to predictably exploit the variation in diffraction element spatial profile for amplitude control. To implement width-based (more generally: spatial-profile-based) diffractive element amplitude control, entire diffractive element virtual contours may be continuously written with diffractive element profile varying as necessary from diffractive element to diffractive element. It may also be desirable to vary diffractive element profile along an individual diffractive element virtual contour (variation within diffracting regions and/or among multiple diffracting regions), providing an additional degree of design control over the diffractive element transfer function. Profile-based and partial-fill gray scale may be used in combination with each other and/or in combination with additional diffractive element amplitude control factors such as feature depth or height. In general, variation of a spatial profile of an optical property within a diffracting region, from one diffracting region to another, and/or from one diffractive element to another enables nearly arbitrary determination of the transfer functions (element and collective transfer functions).

Proportional-Line-Density Gray Scale

A typical distributed optical structure may consist of many thousands of individual diffractive elements. An amplitude apodization function for the distributed optical structure may be viewed as a continuous function giving diffractive amplitude as a function of position along the direction of optical propagation through the structure. Amplitude apodization of a distributed optical structure may be implemented by giving diffractive elements at various spatial positions within the structure diffractive amplitudes proportional to a selected apodization function. Doing so would, in general, involve control over individual diffractive element scattering amplitudes. Proportional-line-density gray scale comprises an alternative to varying the diffractive amplitude of individual diffractive elements.

In a first embodiment of proportional-line-density gray scale, apodization functions are implemented in a distributed optical structure by treating the amplitude apodization function as a weighting function used to determine whether individual diffractive elements are written or omitted. In many cases, it will be desirable to give the peak apodization function value a writing probability weighting of unity so as to maximize the total number of diffractive elements written and therefore maximize the scattering strength (reflectivity) of the distributed optical structure as a whole. However, the peak of the amplitude apodization can be set to any desired writing probability weight between unity and zero. In a distributed optical structure thus apodized, the average number diffractive elements per unit length will vary with distance along an optical propagation direction in proportion to the amplitude apodization function. If the amplitude apodization function has a constant value and this value is set equal to unity writing probability, an apodized distributed optical structure will consist of equally spaced diffractive elements whose absolute spacing will be determined by the wavelength of the light to be reflected and the diffractive order in which the distributed optical structure operates. In first diffractive order, a spacing of one-half wavelength between diffractive elements would pertain if the distributed optical structure operates in retroreflection. The diffractive elements obtained in the case of unity probability writing weight may be referred to as nominal diffractive elements. If the writing probability is set equal to 0.5 instead, each nominal diffractive element location is populated with a written diffractive element with 50 percent probability. In more general cases where the amplitude apodization function varies spatially, the probability that any nominal diffractive element location is populated with a diffractive element is made proportional to the value of the amplitude apodization function at the location of the nominal diffractive element. This approach to apodization of distributed optical structures allows one to utilize diffractive elements of identical physical dimensions, which for some fabrication approaches may be most convenient, and still achieve local variation in the effective diffractive strength of the distributed optical structure.

The first implementation of proportional line-density gray scale is depicted schematically in FIGS. 9a and 9b. In FIG. 9a, a channel waveguide with a distributed optical structure written with constant apodization amplitude is depicted. The apodization function is a constant and the probability weighting function for writing diffractive elements, w(x), is set equal to unity. The short periodic vertical lines in FIG. 9a represent diffractive elements. With w(x)=1 throughout the distributed optical structure, the diffractive elements shown comprise all of the nominal diffractive elements of the structure. The diffractive elements may, for example, be lithographically scribed trenches in the top surface of the channel waveguide. In FIG. 9b, a channel waveguide is apodized according to a simple apodization function which is stepwise constant with the weighting at both ends of the channel waveguide being twice the apodization weight in the center of the channel waveguide. In this exemplary case, the diffractive element writing probability is equated to unity at the ends of the channel waveguide distributed optical structure while the diffractive element writing probability is set equal to 0.5 in the center. The nominal diffractive elements in the central region of the channel waveguide DBR were written or not written according to a random number generator providing numbers in the range of 0–1. The nominal diffractive element was written when the random number generator produced a number greater than 0.5. When larger numbers of diffractive elements are involved the number of diffractive elements per unit length is, on average, proportional to the amplitude apodization function when the described method of choosing which nominal diffractive elements are written is employed.

Figure 10:
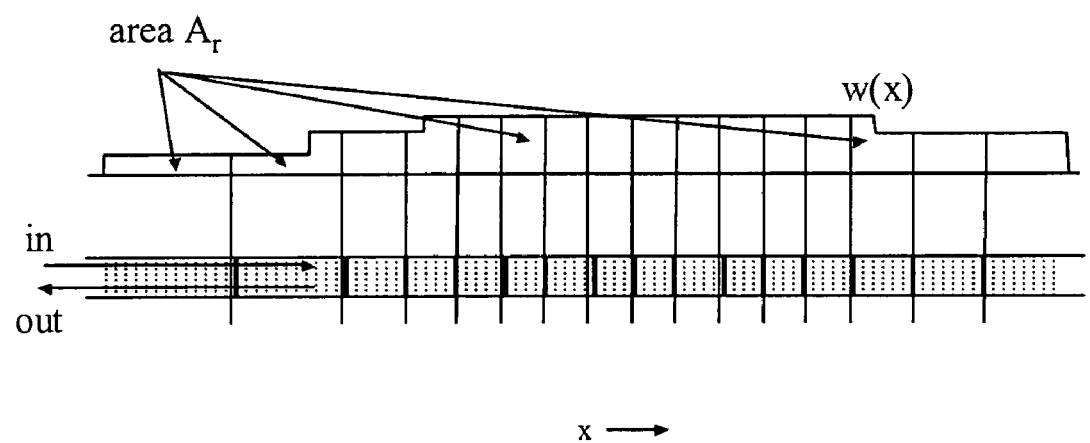
FIG. 10 is a schematic diagram of a distributed optical device having a position-dependent density of diffractive elements.

In some cases, it may be desirable to utilize a more deterministic approach to deciding whether diffractive elements are written or not written. In a second implementation of proportional-line-density gray scale, diffractive elements are written through reference to the accrued area under the amplitude apodization function. First, one chooses a reference unit of accrued area, $A_r$. Then one chooses a convenient reference location. Then one moves across the nominal diffractive element locations (i.e., virtual contour locations) and writes a diffractive element at the nominal diffractive element location closest to each location at which the accrued area under the apodization function increases by one $A_r$ unit. To maximize the total number of diffractive elements in the amplitude apodized distributed optical structure, which is often desirable to maximize peak overall reflectivity, one can choose the reference unit of accrued area $A_r$ to be equal to $A_m$, where $A_m$ is approximately equal to the nominal diffractive element spacing multiplied by the peak apodization value. When other reference units of accrued area $A_r \geq A_m$ are employed, the total number of written diffractive elements in the distributed optical structure will vary as $A_m/A_r$. If $A_r$ is chosen significantly smaller than $A_m$, the apodization function will be partially distorted. A channel waveguide distributed optical structure apodized using the method just described is shown schematically in FIG. 10.

Another variation of the present amplitude apodization method is implemented by dividing the distributed optical structure into sections each containing a fixed number of consecutive virtual contours. The number of virtual contours included in each section is set equal to the amplitude resolution desired in the apodization process. For example, if 10 levels of amplitude resolution are desired in the apodization, sections are set to a length that includes 10 virtual contours. The total number of sections in this example would be approximately equal to the total number of defined virtual contours divided by ten. To write the distributed optical structure, the apodization amplitude is normalized to peak value equal to the number of nominal diffractive elements assigned to each section. Then the average apodization amplitude throughout each section is rounded to an integer. Then a number of nominal diffraction elements are written within each section with that number being equal to the integer representing the rounded average apodization amplitude within the section. The nominal diffraction elements chosen for writing within each section can be chosen according to any convenient method.

In some cases, an apodization function can assume negative values implying a 180 degree phase change relative to positive apodization values. For the purposes of the present invention, the absolute value of the amplitude apodization function should be utilized for determining the probability that a given nominal diffraction element is chosen for writing. The phase shift implicit in negative versus positive values of the apodization function can be incorporated by introducing spatial shifts of the diffractive elements independent of relative amplitude control. Should a fully complex-valued apodization function be employed, the modulus of the apodization function should be employed in the exercise of proportional-line-density gray scale with phase control implemented through other means including spatial shifts of the diffractive elements or changes in their reflective phase as for example by changing their widths.

In general overview, it should be noted that amplitude apodization can be achieved in a variety of distributed optical structures by controlling the number of diffractive elements per unit length to vary in proportion to the desired amplitude apodization function to achieve numerous levels of gray scale. Such structures may include, but are not limited to: 2D planar distributed optical structures, 1D channel waveguide distributed optical structures, fiber Bragg grating distributed optical structures, 3D distributed optical structures, and other such distributed optical structures. There are many variations as to how to choose which of the nominal diffractive elements should be written, but it is the essence of the present invention that the local density of diffractive elements per unit length be controlled to vary proportionally the desired amplitude apodization function.

Facet-Displacement Gray Scale

A potential drawback of gray scale approaches described thus far is that they involve spatial variation in the density of optical alterations employed to form diffracting regions. Such optical alterations (e.g., trench etching) may locally alter the effective refractive index. Specifically, parts of the distributed optical structure in which diffracting regions are spatially sparse may have a different effective refractive index and consequently a different resonance wavelength compared to parts of the distributed optical structure in which diffracting regions are spatially dense. It is possible to design distributed optical structures employing the gray scale methods described above to compensate for the effective refractive index variations introduced by spatial variations in the density of optical alterations. This can be done by varying the diffractive element spacings so that the product of local effective refractive index (dependent on local fill factor, local element width, and/or local written-element density) multiplied by diffractive element spacing (the optical path between diffractive elements) is maintained at a value appropriate for proper functioning of the distributed optical structure. The variation of local effective refractive index introduced by variations in the spatial variation of optical alterations can be calculated using standard methods known in the art or can be calibrated by actual measurement of test devices having different densities of optical alteration. An alternative method of compensation comprises a variation in waveguide geometry, for example the thickness of a slab or channel waveguide, to hold the total effective refractive index of the distributed optical structure at a desired value or range of values. Nevertheless, approaches to reflective amplitude and/or phase control in distributed optical structures that leave areal element density and effective waveguide refractive index largely unchanged (and therefore requiring no compensation) are desirable. Under the general descriptor "facet-displacement gray scale" are several approaches that allow one to control the reflective amplitude of diffractive contours while maintaining a substantially constant spatial density of optical alterations and thus substantially constant effective refractive index.

Figure 11A:
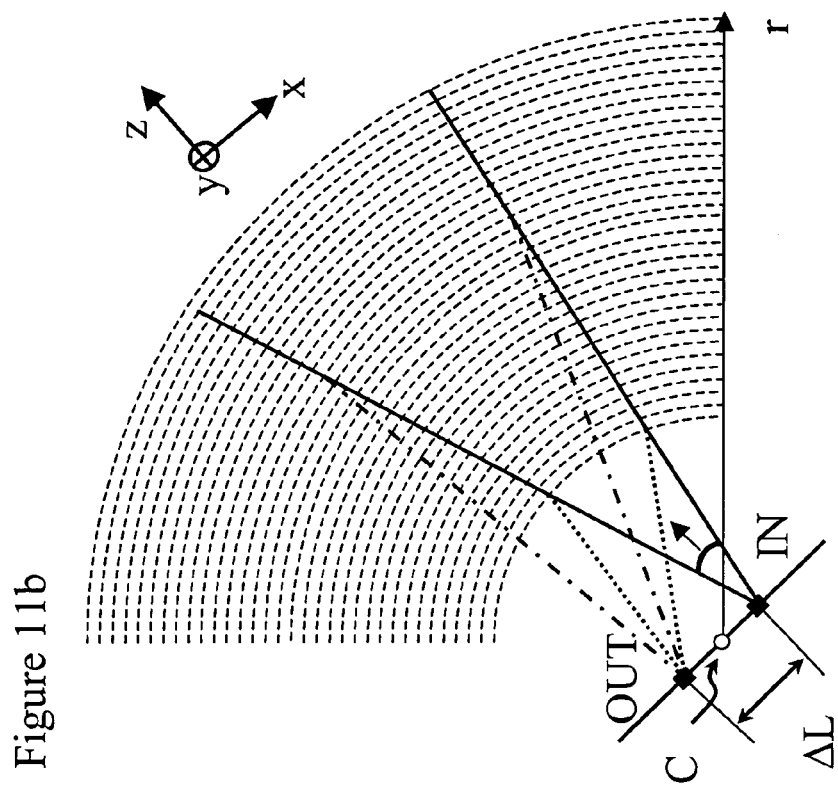
FIGS. 11a and 11b are side cross-section and top views of a distributed optical device.
Figure 11B:
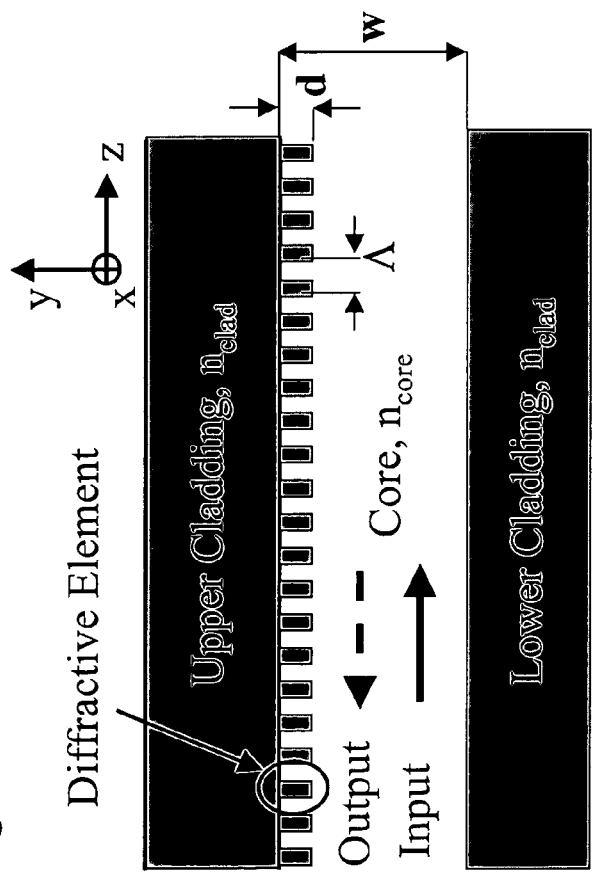

FIGS. 11A and 11B are pictorial representations of a holographic Bragg reflector (HBR). A typical HBR cross-section is shown in FIG. 11A, while FIG. 11B is a schematic top plan view. The HBR consists of a slab waveguide with a central core of thickness w and bilateral cladding layers. For single-mode waveguides, the core thickness w is typically 2 to 6 times the in-medium design wavelength of the device. For multimode applications, w can be on the order of 30 to 60 times the in-medium design wavelength of the device. For example, at communication wavelengths ($\lambda_{air} \sim 1.5$ μm), the thickness of the planar waveguide may be about 4 μm, if the waveguide medium is silica, core-cladding refractive index differences on the order of 0.01 are employed, and single-mode operation is desired. While a HBR is set forth as an exemplary embodiment for illustrating the principles of facet-displacement gray scale, it should be noted that the principles thus illustrated may equivalently apply to any distributed optical structure, including those disclosed herein and equivalents thereof, within the scope of the present disclosure and/or appended claims.

FIG. 11A depicts cross-sections of representative diffractive regions of depth d and spacing $\Lambda$, which, for the specific exemplary embodiment of FIGS. 11A and 11B, are located at the upper core-cladding interface and consist of trenches that are filled with cladding material. For operation in the $m^{th}$ diffractive order, the spacing $\Lambda = m \cdot \lambda_0 / 2n_{eff}$, where $n_{eff}$ is the effective refractive index of the waveguide and $\lambda_0$ is the vacuum wavelength of the reflected light. For example, at a wavelength of $\lambda_0 = 1.5$ um, in first order (m=1), and with a silica core material ($n_{eff} \approx 1.5$), $\Lambda \approx 500$ nm. Other locations for the diffracting regions, e.g. entirely within the waveguide, are possible and such geometries should be considered within the scope of the presently discussed invention. Other types of diffractive elements are possible as well, e.g. ribs on top of the waveguide core or bulk refractive index changes in the core material induced by optical exposure or other means. The facet-displacement gray scale control methods (as well as other reflective amplitude and phase control methods) disclosed in the present application are applicable to a broad range of diffractive element morphologies and, while discussion thereof may be limited to specific examples, application of the disclosed methods to diffractive element forms different from those specifically discussed should be considered within the scope of the present disclosure and/or appended claims.

FIG. 11B is a top view of the two-dimensional waveguide containing the planar HBR. An optical signal is coupled into the planar grating device via an input port, IN, that is comprised of but not limited to a channel waveguide, an edge mounted fiber, or the focal spot of a free-space light source. The input beam expands by diffraction in a slab region and is subsequently spectrally filtered and spatially directed to the output port, OUT, by the planar hologram. The diffractive elements of the HBR are spatially defined with respect to virtual contours that are represented by the dashed lines in FIG. 11B. The virtual contours may be designed individually to optimally spatially mode-match the back-diffracted input field to the output port, and are positioned relative to one another so that a superposition of diffracted field components at the design wavelength would exhibit maximal constructive interference (if the diffracting regions of the corresponding diffractive elements were to spatially coincide with the virtual contours). As disclosed hereinabove and in the above-cited references, the detailed spacing and relative amplitude of the diffractive elements corresponding to the virtual contours as a function of position along the input direction determine the spectral transfer function of the device. Specifically, in the limit of weak device reflectivity, the HBR spectral transfer function is proportional to the spatial Fourier transform of the complex-valued diffractive element amplitude and phase distribution. In the device discussed here, the virtual contours are circular arcs which are concentric about center of curvature, point C. Such virtual contours do not provide optimal input-output spatial mapping. Optimal virtual contours may be generated following procedures known from the design of aspheric reflective optics. The approaches to reflective amplitude control that will be disclosed herein apply to diffractive virtual contours of arbitrary shape. Even though facet-displacement gray scale is discussed in the specific context of exemplary virtual contours of relatively simple shape, this must not be construed as limiting the scope of the of the present disclosure and/or appended claims.

Figure 12:
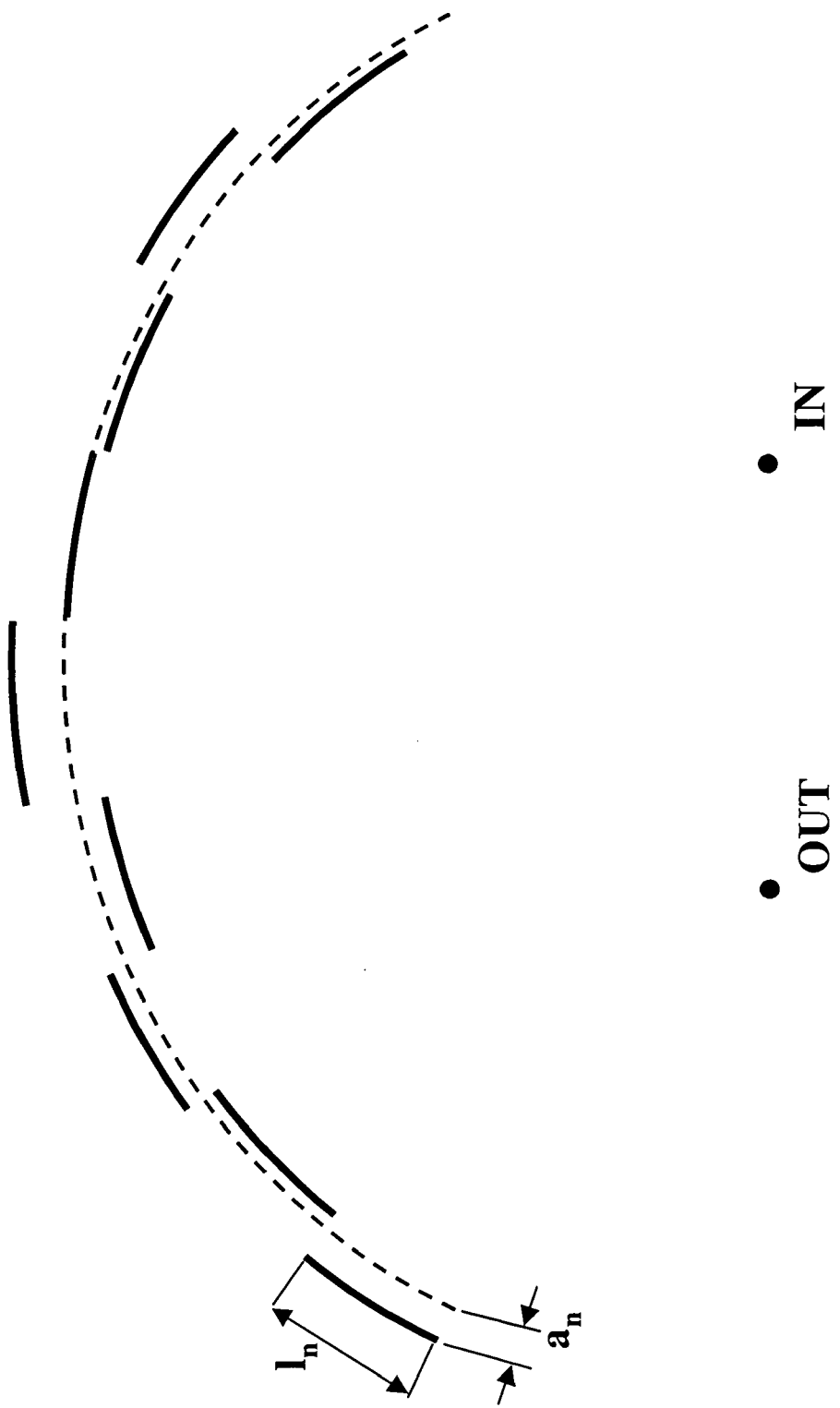
FIG. 12 illustrates schematically a diffractive element having varying longitudinal facet displacements relative to a virtual contour.
Figure 13:
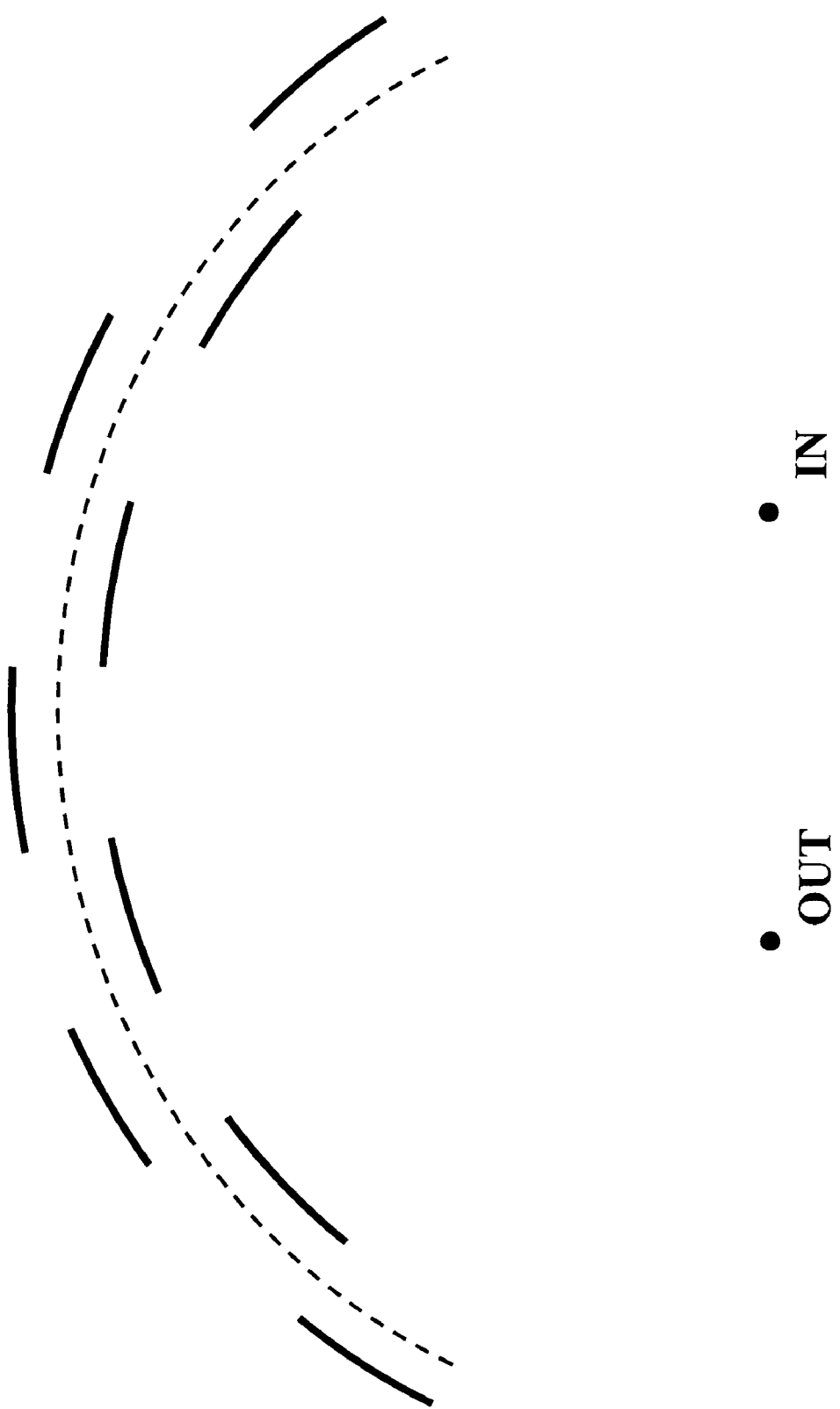
FIG. 13 illustrates schematically a diffractive element having uniform longitudinal facet displacements relative to a virtual contour.
Figure 14:
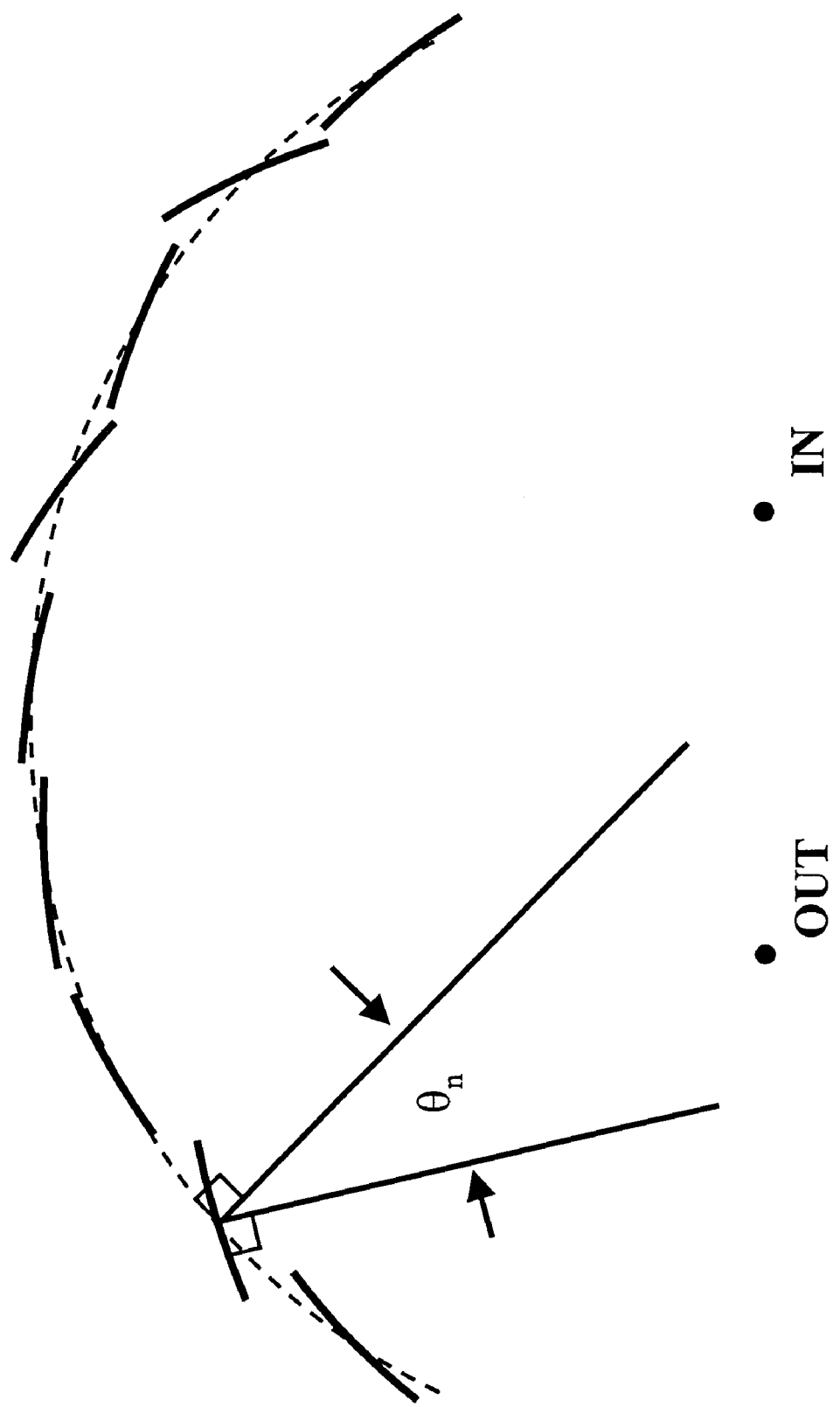
FIG. 14 illustrates schematically a diffractive element having angular facet displacements relative to a virtual contour.

FIGS. 12–16 shows an exemplary individual diffractive element of a distributed Bragg structure. The diffractive element is designed to couple light from an input port, IN, to an output port, OUT. The dashed line in FIGS. 12–16 represents an equal phase virtual contour, i.e. all optical paths connecting the centers of the input and output ports via reflection from this contour exhibit the same optical distance. While equal-phase virtual contours are frequently employed in the design of distributed optical devices (and is employed in the present example), virtual contours that are not equal-phase contours may also be employed within the scope of the present disclosure and/or appended claims. The diffractive element corresponding to the virtual contour comprises multiple diffractive facets (i.e, diffracting regions, represented by solid lines) shown in the exemplary embodiments of FIGS. 12–16 as curvilinear segments along the virtual contour. In the specific embodiments of FIGS. 12–14 the diffracting facets are presumed to consist of simple reflective surfaces. As discussed below, the diffracting facets may be realized in the form of etched trenches, ribs, bulk refractive index changes, etc. A given diffracting facet n is characterized by its angular orientation $\theta_n$ (FIG. 14), offset $a_n$ from the virtual contour (FIGS. 13 and 14), and by its angular span $I_n$ (FIGS. 12–14). The angle $\theta_n$ is defined to be the angle between the facet's central surface normal and the normal to the virtual contour measured at the point nearest to the facet center. The offset $a_n$ may be conveniently measured from the diffracting facet center of gravity. The overall imaging properties of the diffractive element, comprising all diffracting facets along a given virtual contour, are heavily influenced by the orientation, offset, and span of all its constitutive diffracting facets. The specific embodiments of FIGS. 12–14 show diffractive elements comprising diffracting facets which all have essentially the angular span $I_i$. Realizations of diffractive elements employing diffracting facets that are different from each other in this or other parameters are possible and should be regarded as within the scope of present disclosure.

The electric field at the device output port OUT produced by a specific diffractive element is given by the coherent sum of the fields diffracted from the individual diffracting facets. For a given diffracting facet, the back-diffracted field amplitude is determined by the input field amplitude at the location of the diffracting facet and the facet's reflection coefficient, $r_n$. The exemplary analysis given here will omit variations of reflection coefficient or input field along the diffracting facet's length. Nevertheless, cases in which either or both of the aforementioned phenomena occur should be regarded within the scope of the disclosed invention. Means for including such variations involve integrating varying quantities across facets and are well known in the art. The electric field value at the output port OUT is typically maximal when the contributions from all diffracting facets to the coherent sum at the output port are phased to constructively interfere. In the embodiments of FIGS. 12–14, fully constructive interference among the facets occurs at the output port center when all diffractive facets are spatially coincident with an equal-phase virtual contour, i.e. when $a_i = \theta_i = 0$, where i denotes the ith diffracting facet.

Since the total field reflected from the diffractive element shown in FIG. 12 is given by the coherent sum of the contributions originating from its constituent diffracting facets, control of the strength of the overall reflected field, for a given wavelength, may in principle be attained via three different approaches. First, methods may be devised that affect the amplitude of the individual back-diffracted fields while leaving the phase relationships between them (as determined at the output port) unchanged from those implemented in the equal-phase virtual contour shown in FIG. 12. Such approaches have been addressed hereinabove and in several of the above-cited applications. Second, approaches may be devised in which the overall magnitude of the output field is affected by altering the phase relationships between the fields emerging from individual facets while leaving the field strength of the latter (approximately) unchanged. A third category consists of methods in which reflective amplitude control is achieved through both affecting the field amplitude and optical phase of the individual facet fields. Facet-displacement gray scale is primarily concerned with methods to control the reflective amplitude of a diffractive element that fall into the second and third categories.

FIGS. 12 and 13 address approaches to reflective amplitude control that are based on longitudinally offsetting diffractive facets (i.e., diffracting regions) from an equal-phase virtual contour, i.e. choosing values $a_i$ different from zero that vary from facet to facet. The spatial offsets of the diffracting facets from the equal-phase virtual contour introduce optical phase differentials between different facets that affect the amplitude of the total output field as measured at the output port. The approach presented in FIG. 12 provides, in principle, for continuous control of the reflective amplitude of the diffractive element in the range from zero reflective amplitude, when the individual diffracting facets are phased to cancel each other's contribution at the output port (i.e., destructively interfere), to a maximum value occurring when all facet field contributions are in phase (i.e., constructively interfere).

The specific values $a_i$ employed for offsetting diffracting facets may be determined randomly or according to deterministic functions. An example of a diffracting facet arrangement falling into the latter category is shown in FIG. 13. Here, adjacent diffracting facets are alternately displaced by $\pm b$ from the equal-phase virtual contour, i.e. a spatial offset of the same magnitude but alternating from side to side of the virtual contour. When b is equal to $\lambda_0/(8n_{eff})$ the overall reflective amplitude of the entire diffractive element is approximately zero. Periodically structured positional arrangements of diffracting facets, such as the one shown in FIG. 13, may exhibit diffraction maxima in the output plane at locations different from the designed output port. These are caused by fully or partially constructive interference of light diffracted from the offset facets and may be detrimental to device performance. Choosing spatial offset values that are random in offset magnitude and direction, as shown in FIG. 12, provides a pathway for mitigation of this problem, if necessary or desired. A drawback of randomly distributed offset values, however, is that the resulting overall reflective amplitude can only be designed within the precision dictated by the laws of statistical analysis. A combination of random facet displacement and deterministic control is also possible.

An initial set of facet displacements with an rms value set to statistically provide the desired net diffractive element reflective amplitude may be calculated. Then the sum of the fields generated may be calculated and adjusted to a precisely desired value by resetting the longitudinal displacement of one or more facets. It should be noted that once the distribution of displacements $a_i$ have been determined to set the reflective strength of a diffractive element to a desired value, a uniform additional displacement may be added to all diffracting facets of the diffractive element to set the overall phase of the field reflected from the diffractive element relative to that of other diffractive elements of a distributed optical structure.

In the specific embodiment of FIG. 12, the spatial offset values fall in the range between $a_i = \pm \lambda_0/(8n_{eff})$, where $\lambda_0$ is the vacuum wavelength of light at the center of the overall reflective bandpass of the distributed optical structure (i.e., the design wavelength). Spatial displacements in this range correlate with changes of the back diffracted field phases in the range of $\pm \pi/2$ as measured at the output port. Phase changes implemented over the range $\pm \pi/2$ can provide full reflective amplitude control. Larger phase differences correlated with proportionately larger spatial displacements between constituent facets of the diffractive elements may be implemented to achieve reflective amplitude control as well. However, one must consider that, in general, the reflectivity of the diffractive element will exhibit a stronger wavelength-dependence as the maximum optical path difference between diffractive facets is increased. The fractional spectral bandpass, $\Delta\lambda/\lambda_0$, over which the reflectivity remains relatively constant is given approximately by $\lambda_0/L$ where L is the maximal displacement employed.

FIG. 14 depicts a different approach to reflective amplitude control. Here, constituent diffracting facets exhibit angular offsets of varying degrees with respect to the equal-phase virtual contour. Maximum coupling to the output port is achieved when all diffracting facets are oriented along the virtual contour profile, which is assumed to be configured to image the input port onto the output port. Angular orientations deviating from this configuration will result in weakened optical coupling. One approach to determining the detailed angular placement of the facets to produce various levels of reflective amplitude is to first assign relative angular displacements in the interval $[-1, 1]$. This may be done randomly or deterministically, with the provision, for pure amplitude control, that individual facet angular displacements are adjusted via standard diffractive calcualtions to substantially eliminate phase changes in the net diffracted field at the output port. Numerical application of diffraction theory is utilized to find the relative reflective strength of the facet distribution when the fixed set of relative angular displacements is multiplied by various fixed angles in the range $[0, \pi/2]$. This process results in a calibration of diffractive element reflective amplitude versus an angular displacement multiplier, which can be used to amplitude apodize the multiple diffractive elements of a distributed optical structure. Other algorithms for determining relative angular displacements of diffracting facets for diffractive element amplitude control may be equivalently employed, and shall fall within the scope of the present disclosure and/or appended claims.

Figure 15:
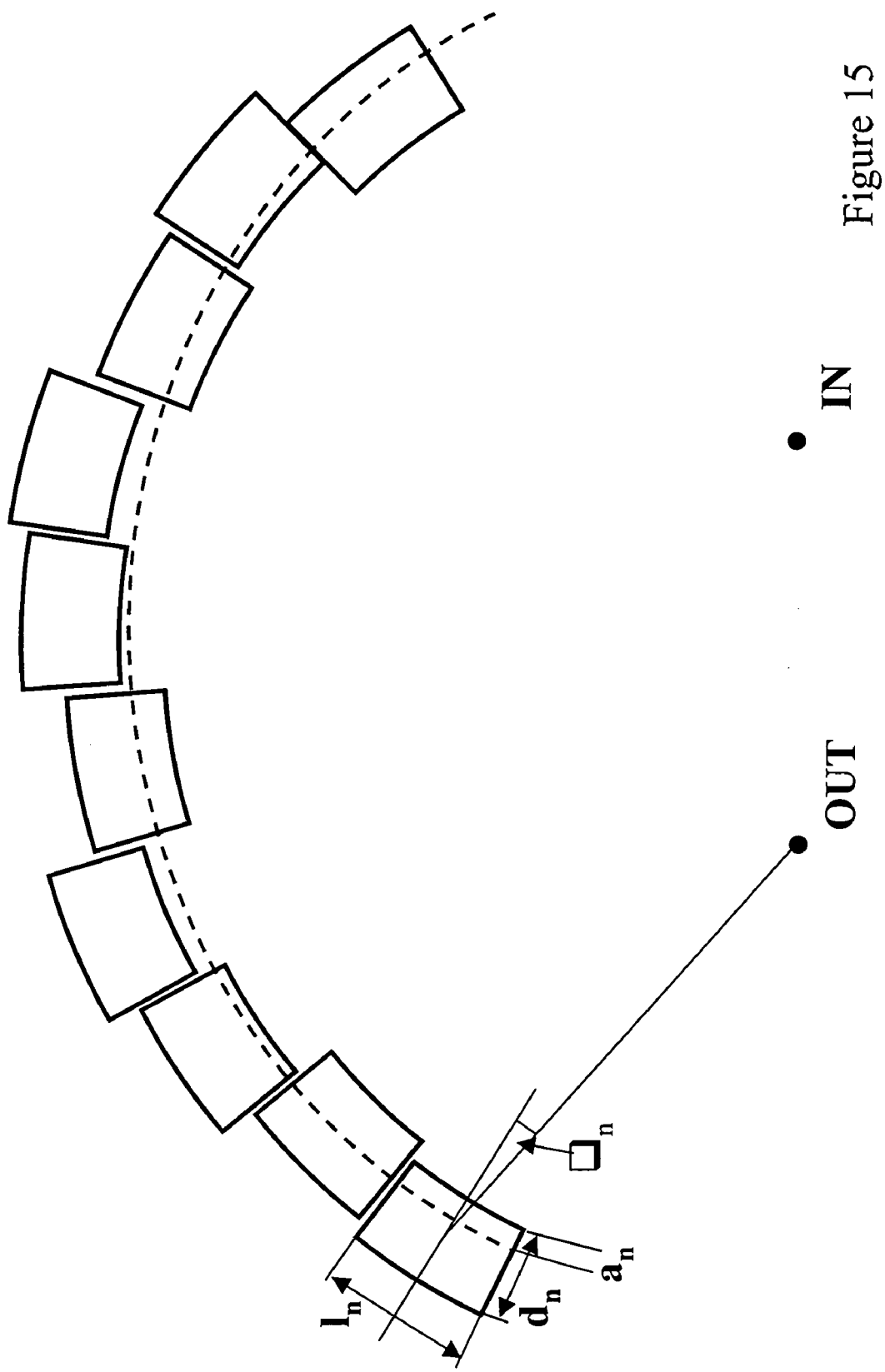
FIG. 15 illustrates schematically a diffractive element having uniform facet thickness and varying longitudinal facet displacements relative to a virtual contour.
Figure 16:
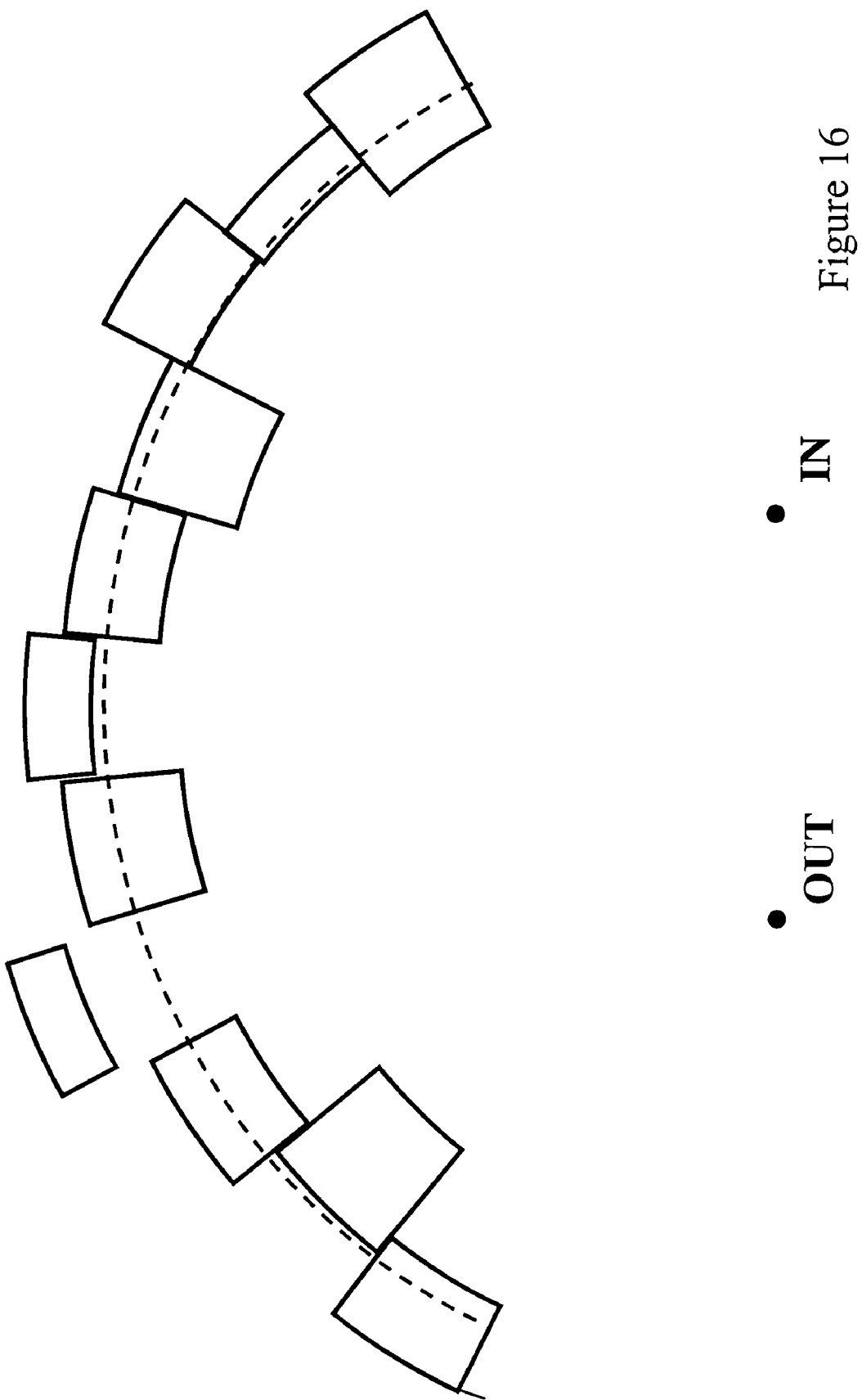
FIG. 16 illustrates schematically a diffractive element having varying facet thickness and varying longitudinal facet displacements relative to a virtual contour.

FIGS. 15 and 16 show a different type of diffractive element, which may be viewed as employing a combination of facet-displacement and width-based gray scale. The diffractive element comprises multiple diffracting facets, each with two reflecting surfaces. Such facets are generated, e.g., by etching a trench into a material of a given dielectric constant and filling it with material of a different dielectric constant. Again, a given diffracting facet n may be characterized by its angular orientation $\theta_n$, offset $a_n$ from a virtual contour, and by its angular span $I_n$. An additional parameter, distinct from the conceptual single-surface diffractive facets of FIGS. 12–14, is the optical thickness or optical pathlength, $d_n$, of the two-surface facets, given by physical distance between the two surfaces times the facet refractive index. All the aforementioned approaches to the control of a diffractive element's reflective amplitude apply to the case of two-surface diffracting facets. Additionally, for a given wavelength, the parameter $d_n$ may be used to control the amplitude of the light back-diffracted from the facet as disclosed for the case of entire contours hereinabove (i.e., width-based gray scale). FIG. 15 shows an embodiment where a diffractive element comprises facets of the same thickness, while FIG. 6 shows an embodiment where a diffractive element comprises facets having varying thicknesses. Control over the distribution of facet thicknesses and displacements provides control over the net reflectivity of the entire diffractive element. Again, the facet-to-facet width variations may be implemented in a statistical or deterministic way, with the aforementioned advantages and disadvantages.

Figure 17:
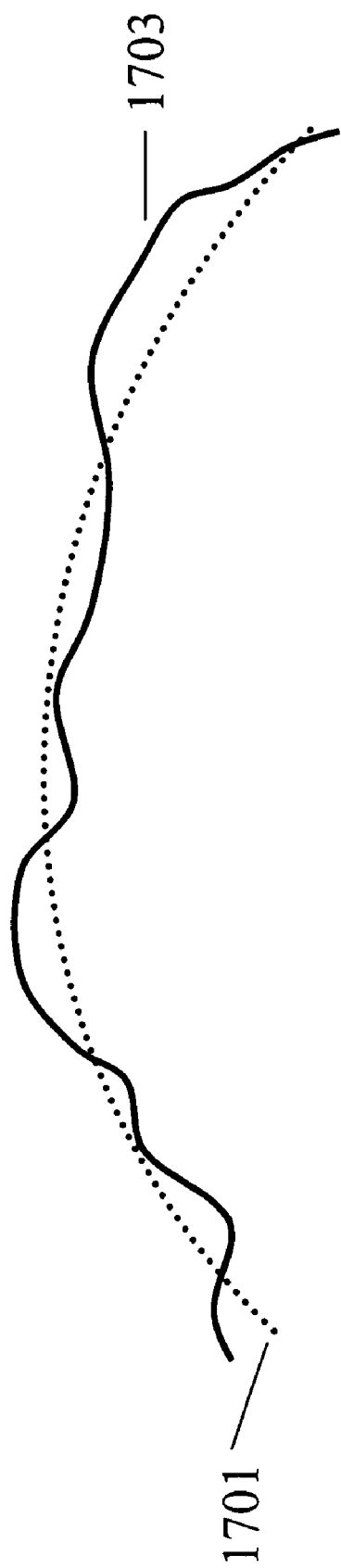
FIG. 17 illustrates schematically a diffractive element having angular and longitudinal facet displacements continuously varying relative to a virtual contour.

In the above disclosures, diffractive contours have been described as having been divided into facets. This is not necessary. The reflective amplitude of diffractive elements can equally well be controlled by introducing displacements of various portions (i.e. diffracting regions) of a single continuous diffractive element about a corresponding virtual contour. This scenario may be still described in terms of the facet descriptions above, but the facet displacements and angular orientations are constrained so that facets connect at their ends. Such a configuration is shown in FIG. 17, where the dashed curve 1701 represents an equal-phase virtual contour and the solid line 1703 represents a diffractive element comprising a single continuous diffracting region, with various portions thereof displaced from the virtual contour. Division of the diffractive element into sufficiently many connected diffracting facets enables description of the diffractive element in terms of longitudinal and rotational facet displacements (as described hereinabove). Similarly, the optical thickness of the diffractive element may be varied along the virtual contour, and maybe described in terms of multiple connected facets of varying optical thickness. These "continuous-facet" approaches shall fall within the scope of the present disclosure and/or appended claims.

Element-Displacement Gray Scale

Figure 18:
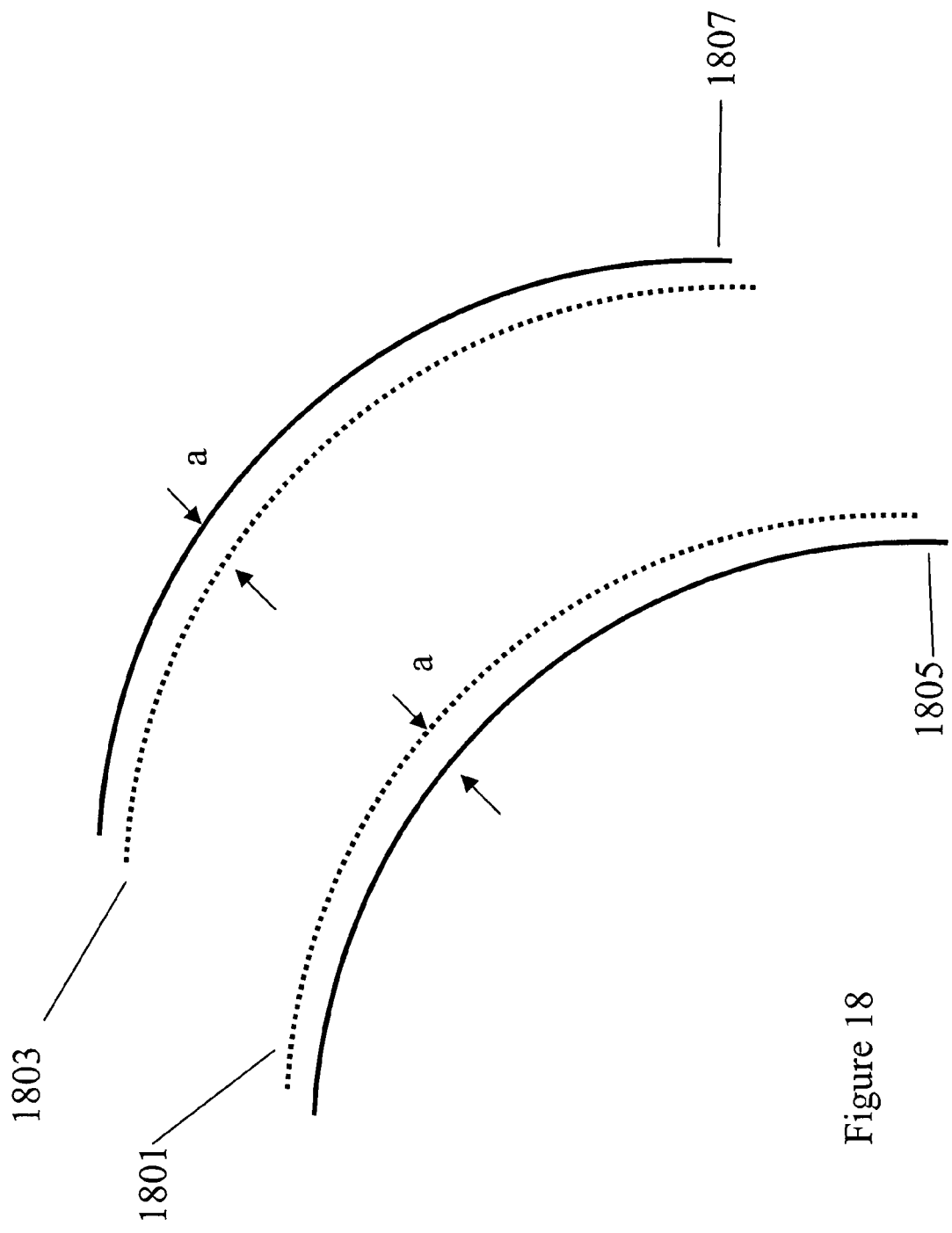
FIG. 18 illustrates schematically a pair of diffractive elements displaced longitudinally from their respective virtual contours in a correlated manner.

Another related approach to reflective amplitude control for a distributed optical structure may be referred to as element-displacement gray scale. It is often the case that desired reflective amplitude variations for the diffractive elements (i.e., longitudinal variation of the apodization function) occur slowly on the distance scale of individual diffractive element separations. In other words, the amplitude reflectivity desired may be relatively constant over many diffractive element spacings. In this case, it is possible to achieve reflective amplitude control using element-displacement gray scale. Element-displacement gray scale can be implemented in a correlated form or a statistical form. In the correlated form, correlated spatial displacements are introduced for two or more adjacent or non-adjacent diffractive elements. For example, as shown in FIG. 18, if one diffractive element 1805 is moved forward relative to its corresponding virtual contour 1801 by $a=\lambda_0/8n_{eff}$ and the next diffractive element 1807 is moved backward by the same amount relative to its corresponding virtual contour 1803, the signals from the two diffractive elements will cancel. If paired forward and backward displacements of smaller magnitudes are utilized in the example of FIG. 18, the effective reflective amplitude of the pair of diffractive elements can be adjusted to between about 0 and the maximum value (i.e., constructive interference) without affecting the overall phase of the signal from the correlated diffractive element pair. The opposite spatial displacements of the diffractive elements as shown in FIG. 18 introduce opposite phase shifts of the back-diffracted fields. The displacement of $a=\lambda_0/8n_{eff}$ gives rise to a phase shift having a magnitude of 90°, and the magnitude of the achieved phase shift scales linearly with displacement a. The net phase shift of the summed back-diffracted field has no net phase shift but has a displacement-dependent amplitude. Control over offsets of a set of two or more correlated diffractive elements can be employed to fully control the relative diffractive amplitudes of the set of correlated elements. The reflective phase of the correlated diffractive element set may be adjusted by longitudinally displacing the entire set, as described hereinabove. Correlated displacement of elements to achieve variable reflection also preserves areal diffracting region density (i.e., density of optical alterations), and therefore does not significantly affect the effective refractive index.

Element-displacement gray scale can be implemented in a statistical form. Reflective amplitude control may be achieved by statistically displacing the diffractive elements longitudinally from their corresponding virtual contours. This can be done most conveniently by dividing the distributed optical structure into sections each containing a plurality of virtual contours. To control the amplitude of a single section, diffractive elements are displaced from their respective virtual contours by a random amount within a range of [−c, +c]. Displacement of conveniently chosen diffractive elements should be trimmed to set the net phase shift of the section to a chosen value which is zero for pure amplitude control. Similar trimming can be employed to fine tune the net reflection amplitude of the section. The reflectivity of the set of diffractive elements is related to the rms value of the displacement $c_{rms}$ via diffraction theory calculations. The overall distributed optical structure is apodized section by section using the calibration of displacement coefficient $c_{rms}$ to net reflective amplitude. To achieve full amplitude control values of the displacement coefficient $c_{rms}$ up to $\lambda_0/8n_{eff}$ should be employed. As previously mentioned, a drawback of statistically distributed displacement values, however, is that the resulting overall reflective amplitude can only be designed within the precision dictated by the laws of statistical analysis. A combination of statistical diffractive element displacement and deterministic control is also possible as described in terms of trimming above. An initial set of diffractive element displacements with an rms value set to statistically provide the desired net reflective amplitude may be calculated. Then the sum of the fields generated may be calculated and adjusted to a precisely desired value by resetting the displacement of one or more diffractive elements.

It should be noted that all the individually discussed approaches to diffractive element amplitude and phase control may be combined with each other and implemented in all discussed and other diffractive element forms. Various additional modifications of the present invention will occur to those skilled in the art. Nevertheless, all derivations from the specific teaching of this specification that rely upon the principles and their equivalents through which the art has been advanced are properly considered within the scope of the invention as described and claimed.

It should be noted that control of the reflective amplitude of a diffractive element via: control of fill factor; control of diffractive element width; control of diffractive element density; control of spatial and/or angular displacement of element facets relative to a virtual contour; and control of element spacing have each been disclosed and discussed herein. In some of these discussions the virtual contours have been described as an equal phase contours, wherein paths from input to virtual contour to output have a constant optical length. In some diffractive structures, it may be advantageous to consider virtual contours that do not have an equal phase property. The utilization of any of the disclosed methods for controlling net diffractive element reflectivity can be applied to virtual contours of general character including those that are not equal phase virtual contours.

In summary, several powerful approaches to the control of diffractive element scattering amplitude (both magnitude and phase) are disclosed herein. Controlled virtual contour filling, or partial-fill gray scale, utilizes the fact that output fields arise from sub-fields generated by all points along a diffractive element to control the net reflection (i.e., diffracted signal) from that element. Width- or profile-based gray scale utilizes interference between front- and back-generated reflections to control the net diffracted signal from a diffractive element. Proportional-line-density gray scale (which might be viewed as analogous to partial-fill gray scale implemented for over multiple elements) utilizes a writing probability for each virtual contour to control the diffraction strength from groups of diffractive elements. Facet-displacement gray scale utilizes longitudinal and/or angular displacements of diffracting facets of a diffractive element relative to a corresponding virtual contour for controlling the overall reflected signal strength from the element. Element-displacement grayscale (which might be viewed as analogous to facet-displacement gray scale implemented over multiple elements) utilizes longitudinal displacement of diffractive elements (including correlated displacements) relative to their corresponding virtual contours to control the diffraction strength from groups of elements. These methods may be used in various combinations as well as separately. The partial-fill gray scale approach is especially useful in cases where multiple distributed optical structures must be overlaid in a common region of space. Using partially filled diffractive elements (i.e., diffractive elements not completely filled), distributed optical structures may be overlaid with little actual overlap between diffracting region(s) of the diffractive elements of the different structures. Control of diffractive element trench width or profile may be employed to adjust the scattering strength of overlapping elements to be a linear sum of their individual scattering strengths. Using facet-displacement or element-displacement grayscale, scattering strength of diffractive elements may be achieved without altering an effective refractive index of the optical device. Longitudinal displacements of entire diffractive elements or groups of elements relative to their corresponding virtual contours enables control over the relative amplitudes and phases of the diffracted signal components, and correlated displacements may be employed to achieve amplitude control without altering relative phases of the diffracted components. Combination of these diffractive element amplitude and phase control methods provides powerful means of achieving complicated spectral filtering functions as well as maintaining linearity in devices where multiple distributed optical structures must share the same space.

While the present disclosure has included exemplary embodiments that include distributed diffractive elements in planar waveguide, channel waveguide, and surface geometries, and on diffractive elements that are lithographically scribed, it is nevertheless the case that the methods and approaches presented herein are quite general and can be applied to distributed optical structures of diverse geometries comprising diffractive elements of a general nature active to scatter a portion of optical fields incident on them.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising an optical element having an input optical port, an output optical port, and at least two diffractive element subsets, each subset having at least two diffracting regions, wherein
an input optical field emerging from the optical input port impinges on the diffractive element subsets,
each diffractive element subset diffracts, with a corresponding diffracted-field amplitude and a corresponding diffracted-field phase, at least a portion of the input optical field to the optical output port,
relative diffracted-field amplitude of corresponding diffracted portions of the input optical field diffracted by the diffractive element subsets is determined at least in part by correlated displacement of diffracting regions comprising the diffractive element subsets.

2. The apparatus of claim 1, wherein
the optical element is a waveguide, the waveguide substantially confining in at least one transverse dimension optical fields propagating therein,
each of the diffractive element virtual contours is a curvilinear virtual contour, each of the diffracting regions being a curvilinear diffracting segment.

3. The apparatus of claim 2, wherein the optical element is a channel waveguide, the channel waveguide substantially confining in two transverse dimensions optical fields propagating in one dimension therein.

4. The apparatus of claim 3, wherein the channel waveguide is formed on a substrate.

5. The apparatus of claim 3, wherein the channel waveguide comprises an optical fiber.

6. The apparatus of claim 2, wherein the optical element is a planar waveguide, the planar waveguide substantially confining in one transverse dimension optical fields propagating in two dimensions therein.

* * * * *